United States Patent
Takanashi

(10) Patent No.: US 10,044,924 B2
(45) Date of Patent: Aug. 7, 2018

(54) ACCESSORY APPARATUS, IMAGE-CAPTURING APPARATUS AND CONTROL METHOD THEREFOR

(71) Applicant: CANON KABUSHIKI KAISHA, Tokyo (JP)

(72) Inventor: Hideya Takanashi, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/652,794

(22) Filed: Jul. 18, 2017

(65) Prior Publication Data

US 2018/0027170 A1    Jan. 25, 2018

(30) Foreign Application Priority Data

Jul. 25, 2016 (JP) ................. 2016-145075

(51) Int. Cl.

| H04N 5/225 | (2006.01) |
| H04N 5/232 | (2006.01) |
| G03B 13/36 | (2006.01) |
| G03B 17/14 | (2006.01) |
| G03B 17/12 | (2006.01) |
| H04N 5/235 | (2006.01) |

(52) U.S. Cl.
CPC ......... *H04N 5/23209* (2013.01); *G03B 13/36* (2013.01); *G03B 17/12* (2013.01); *G03B 17/14* (2013.01); *H04N 5/23203* (2013.01); *H04N 5/2254* (2013.01)

(58) Field of Classification Search
CPC ............ H04N 5/2254; H04N 5/23203; H04N 5/23209; G03B 17/12; G03B 17/14

USPC .................................................. 348/360–361
See application file for complete search history.

(56) References Cited

U.S. PATENT DOCUMENTS

| 7,796,184 B2* | 9/2010 | Suemoto | H04N 1/00167 348/360 |
| 9,039,309 B2* | 5/2015 | Oikawa | G03B 17/14 396/529 |
| 9,116,417 B2* | 8/2015 | Morita | G03B 17/14 |
| 9,557,629 B2* | 1/2017 | Imamura | G03B 17/14 |
| 9,618,723 B2* | 4/2017 | Suzuki | G02B 7/36 |

(Continued)

FOREIGN PATENT DOCUMENTS

JP    2010-266595 A    11/2010

*Primary Examiner* — Ngoc-Yen Vu
(74) *Attorney, Agent, or Firm* — Fitzpatrick, Cella, Harper & Scinto

(57) ABSTRACT

The image-capturing apparatus includes a controller that provides, by switching a signal level of an RTS channel from a first level to a second level, a transmission request to an accessory to cause the accessory to transmit accessory data to the image-capturing apparatus through a DLC channel and transmits camera data to the accessory through a DCL channel. The controller selectively performs a first process to switch, after the accessory receiving the transmission request starts transmitting first accessary data, the signal level from the second level to the first level, and a second process to keep, after the accessory receiving the transmission request ends transmitting the first accessary data, the signal level at the second level. The controller receives, while keeping the signal level at the second level in the second process, second accessary data different from the first accessary data.

17 Claims, 17 Drawing Sheets

(56) References Cited

U.S. PATENT DOCUMENTS

| | | | | |
|---|---|---|---|---|
| 2009/0295940 A1* | 12/2009 | Shibuno | ................ | G03B 17/00 |
| | | | | 348/226.1 |
| 2012/0301126 A1* | 11/2012 | Imafuji | ................ | G03B 17/14 |
| | | | | 396/125 |
| 2012/0307131 A1* | 12/2012 | Isaka | ................ | G02B 7/08 |
| | | | | 348/346 |

* cited by examiner

ACCESSORY APPARATUS, IMAGE-CAPTURING APPARATUS AND CONTROL METHOD THEREFOR

BACKGROUND OF THE INVENTION

Field of the Invention

The present invention relates to an image-capturing apparatus (hereinafter referred to as "a camera body") and an accessory apparatus such as an interchangeable lens, which are communicable with each other.

Description of the Related Art

In an accessory-interchangeable camera system including a camera body to which an accessory apparatus is detachably attachable, the camera body and the accessory apparatus (hereinafter referred to as "an interchangeable lens") communicate with each other for controlling the interchangeable lens from the camera body and for providing, from the interchangeable lens to the camera body, data required for controlling the interchangeable lens. An increase in data amount communicated between the camera body and the interchangeable lens requires an increase in communication speed. For example, the camera body performs focus detection using a signal acquired from an image sensor for autofocus (AF), and transmits to the interchangeable lens a control command based on a result of the focus detection for moving a focus lens. The interchangeable lens drives the focus lens depending on the control command and then transmits a notice that indicates an end of the driving of the focus lens. The camera body having received the notice confirms whether or not an in-focus state is obtained. In such communication between the camera body and the interchangeabe lens, the camera body is a communication master, and the interchangeable lens is a communication slave.

Japanese Patent Laid-Open No. 2010-266595 discloses a camera system capable of performing asynchronous communication from a camera body to an interchangeable lens and from the interchangeable lens to the camera body.

In this camera system, the camera body as a communication master transmits operation requests (control commands and the like) to the interchangeable lens as a communication slave at arbitrary times. On the other hand, when the interchangeable lens has to transmit data and the like to the camera body, the interchangeable lens provides a communication request to the camera body through a channel different from a data communication channel.

However, in this camera system disclosed in Japanese Patent Laid-Open No. 2010-266595, the interchangeable lens may provide the communication request to the camera body simultaneously with the operation request from the camera body to the interchangeable lens.

For example, at a time when the interchangeable lens transmits to the camera body a communication request that requests receipt of a notice notifying the camera body of an end of driving a focus lens, the camera body may transmit to the interchangeable lens a control command for instructing driving of the focus lens. In this case, if the camera body receives the notice in response to the communication request from the interchangeable lens after the camera body transmits the control command to the interchangeable lens, the interchangeable lens starts the driving of the lens and thereby returns to the camera body a notice notifying that the focus lens is being driven. In addition, for example, when the interchangeable lens transmits a communication request that requests to the camera body receipt of a notice notifying the camera body of an error such as an operation failure of a focus actuator, the camera body may simultaneously therewith transmit a control command to drive the focus lens to the interchangeable lens.

SUMMARY OF THE INVENTION

The present invention provides a camera system in which an accessory apparatus as a communication slave is allowed to transmit accessory data to a camera body as a communication master without a transmission request from the image-capturing apparatus to the accessory apparatus.

The present invention provides as an aspect thereof an image-capturing apparatus to which an accessory apparatus is detachably attachable. The image-capturing apparatus includes a camera communicator configured to provide, with the accessory apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus, and a camera controller configured to provide, by switching a signal level of the notification channel from a first level to a second level, a transmission request as the notice to the accessory apparatus through the notification channel to cause the accessory apparatus to transmit the accessory data to the image-capturing apparatus through the first data communication channel and to transmit the camera data to the accessory apparatus through the second data communication channel. The camera controller is configured to be capable of selectively performing a first process to switch, after the accessory apparatus receives the transmission request and in response thereto starts transmitting first accessary data as the accessory data, the signal level of the notification channel from the second level to the first level, and a second process to keep, after the accessory apparatus receives the transmission request and in response thereto ends transmitting the first accessary data, the signal level of the notification channel at the second level. The camera controller is configured to, while keeping the signal level of the notification channel at the second level in the second process, receive second accessory data transmitted from the accessory apparatus as the accessory data different from the first accessory data.

The present invention provides as another aspect thereof an accessory apparatus detachably attachable to an image-capturing apparatus. The accessory apparatus includes an accessory communicator configured to provide, with the image-capturing apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus, and an accessory controller configured to, in response to receiving from the image-capturing apparatus through the notification channel a transmission request as the notice provided by a signal level of the notification channel being switched from a first level to a second level, transmit the accessory data to the image-capturing apparatus through the first data communication channel and to receive the camera data transmitted from the image-capturing apparatus through the second data communication channel. When the image-capturing apparatus is configured to be capable of selectively performing a first process to switch, after the accessory apparatus receives the transmission request and in response thereto starts transmitting first accessary data as the accessory data, the signal level of the notification channel from the second level to the first level, and a second process to keep, after the accessory apparatus receives the transmission request and in response thereto ends transmitting the first accessary data, the signal level of the notification channel at the second level, the accessory controller is configured to, while the signal level of the notification channel is kept at the second level, transmit second accessory data as the accessory data different from the first accessary data to the image-capturing apparatus.

The present invention provides as yet another aspect thereof an image-capturing system including the above image-capturing apparatus and accessory apparatus.

The present invention provides as still another aspect thereof a control method of controlling an image-capturing apparatus to which an accessory apparatus is detachably attachable. The image-capturing apparatus provides, with the accessory apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus. The control method includes the step of causing the image-capturing apparatus to provide, by switching a signal level of the notification channel from a first level to a second level, a transmission request as the notice to the accessory apparatus through the notification channel to cause the accessory apparatus to transmit the accessory data to the image-capturing apparatus through the first data communication channel, and to transmit the camera data to the accessory apparatus through the second data communication channel, the step of allowing the image-capturing apparatus to selectively perform a first process to switch, after the accessory apparatus receives the transmission request and in response thereto starts transmitting first accessary data as the accessory data, the signal level of the notification channel from the second level to the first level, and a second process to keep, after the accessory apparatus receives the transmission request and in response thereto ends transmitting the first accessary data, the signal level of the notification channel at the second level, and the step of causing the image-capturing apparatus to, while keeping the signal level of the notification channel at the second level in the second process, receive second accessory data transmitted from the accessory apparatus as the accessory data different from the first accessary data.

The present invention provides as further another aspect thereof a control method of controlling an accessory apparatus detachably attachable to an image-capturing apparatus. The accessory apparatus provides, with the image-capturing apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus. The control method includes the step of causing the accessory apparatus to transmit, in response to receiving from the image-capturing apparatus through the notification channel a transmission request as the notice provided by a signal level of the notification channel being switched from a first level to a second level, the accessory data to the image-capturing apparatus through the first data communication channel and to receive the camera data transmitted from the image-capturing apparatus through the second data communication channel, and when the image-capturing apparatus is configured to be capable of selectively performing a first process to switch, after the accessory apparatus receives the transmission request and in response thereto starts transmitting first accessary data as the accessory data, the signal level of the notification channel from the second level to the first level, and a second process to keep, after the accessory apparatus receives the transmission request and in response thereto ends transmitting the first accessary data, the signal level of the notification channel at the second level, the step of causing the accessory apparatus to, while the signal level of the notification channel is kept at the second level, transmit second accessory data as the accessory data different from the first accessary data to the image-capturing apparatus.

The present invention provides as further another aspect thereof a non-transitory storage medium storing a computer program for causing a computer to execute the above control methods.

Further features of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Embodiment 1

Figure 1:
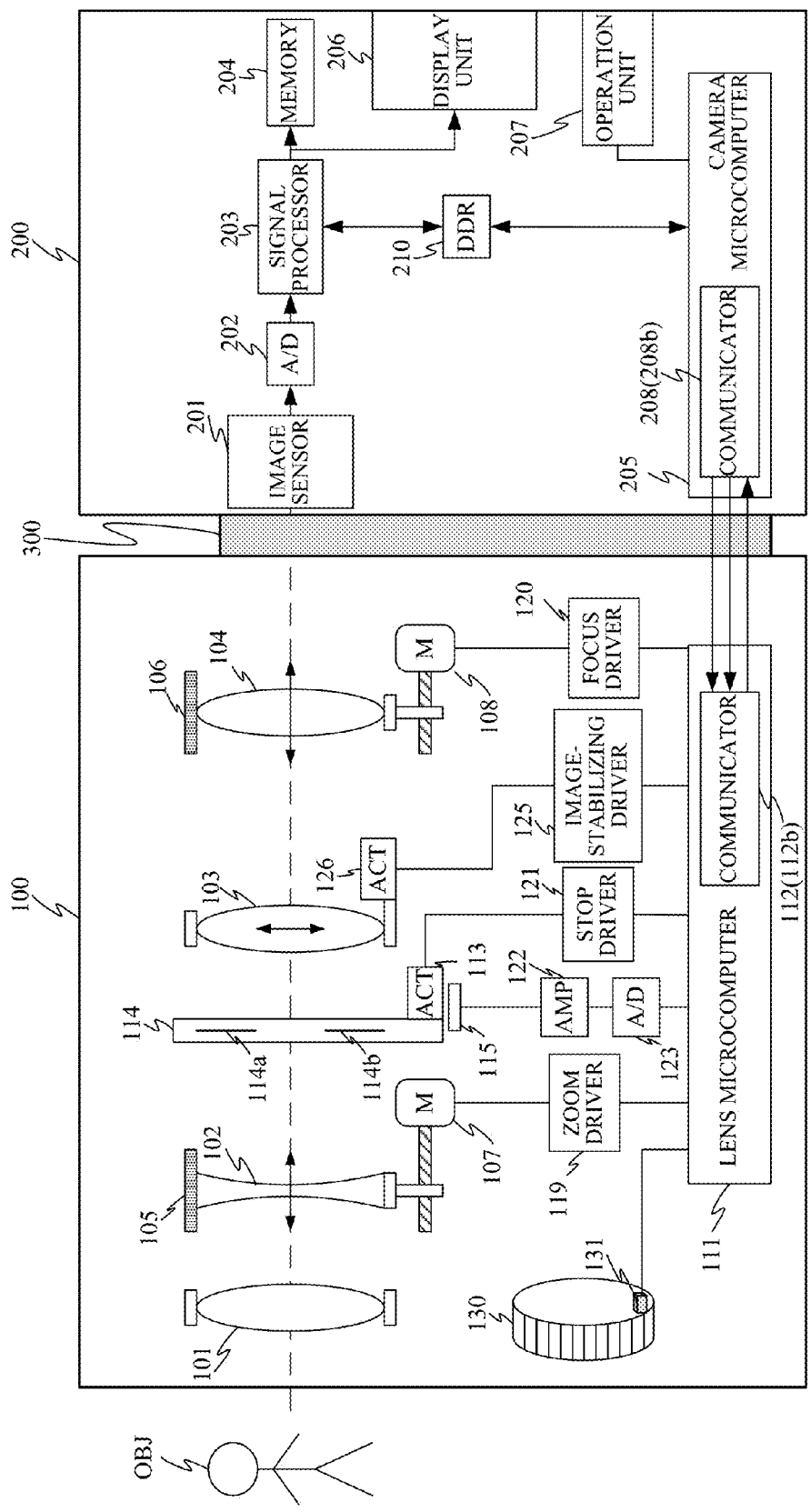
FIG. 1 is a block diagram illustrating a configuration of a camera system that is Embodiment 1 of the present invention.

FIG. 1 illustrates a configuration of an image-capturing system (hereinafter referred to as "a camera system") including a camera body 200 as an image-capturing apparatus and an interchangeable lens 100 as an accessory apparatus that are a first embodiment (Embodiment 1) of the present invention.

The camera body 200 and the interchangeable lens 100 transmit control commands and internal information to each other via their communicators described later. The communicators are compatible with various communication methods and switch their communication formats to the same one in synchronization with each other depending on types of data to be communicated and purposes of their communication, which enables selecting an optimum communication format for each of various situations.

First, description will be made of specific configurations of the interchangeable lens 100 and the camera body 200. The interchangeable lens 100 and the camera body 200 are mechanically and electrically connected with each other via a mount 300 including a coupling mechanism. The interchangeable lens 100 receives power supply from the camera body 200 via a power source terminal (not illustrated) provided in the mount 300 and supplies, to various actuators and a lens microcomputer 111 described later, power sources necessary for their operations. The interchangeable lens 100 and the camera body 200 communicate with each other via communication terminals (illustrated in FIG. 2) provided in the mount 300.

The interchangeable lens 100 includes an image-capturing optical system. The image-capturing optical system includes, from an object (OBJ) side, a field lens 101, a magnification-varying lens 102 for variation of magnification, an aperture stop unit 114 for light amount control, an image-stabilizing lens 103 for image blur correction and a focus lens 104 for focusing.

The magnification-varying lens 102 and the focus lens 104 are respectively held by lens holders 105 and 106. The lens holders 105 and 106 are guided by guide bars (not illustrated) movably in an optical axis direction in which an optical axis (illustrated by a broken line) of the image-capturing optical system extends and are driven in the optical axis direction respectively by stepping motors 107 and 108. The stepping motors 107 and 108 rotate in synchronization with drive pulses and respectively move the magnification-varying lens 102 and the focus lens 104.

The image-stabilizing lens 103 is moved in a direction orthogonal to the optical axis of the image-capturing optical system to reduce image blur caused by user's hand jiggling or the like.

The lens microcomputer 111 as an accessory controller controls various operations in the interchangeable lens 100. The lens microcomputer 111 receives, via the lens communicator 112 as an accessory communicator, control commands transmitted from the camera body 200 and transmission requests for lens data (accessory data) output therefrom. The lens microcomputer 111 performs various lens controls corresponding to the control commands and transmits lens data corresponding to the transmission requests via the lens communicator 112. The lens microcomputer 111 performs operations relating to the communication with the camera body 200 (that is, with a camera microcomputer 205 described later) according to a lens communication control program as a computer program.

This embodiment employs asynchronous serial communication as a communication method between the lens microcomputer 111 and the camera microcomputer 205. In addition, the lens microcomputer 111 outputs, in response to a zoom command and a focus drive command among the control commands, a zoom drive signal and a focus drive signal to a zoom driver 119 and a focus driver 120 to cause them to drive the stepping motors 107 and 108, thereby performing a zoom process to control a magnification variation operation by the magnification-varying lens 102 and an AF (autofocus) control to control a focus operation by the focus lens 104.

The interchangeable lens 100 is provided with a manual focus ring 130 that is rotationally operable by a user and a focus encoder 131 for detecting a rotational operation amount of the manual focus ring 130. The lens microcomputer 111 causes the focus driver 120 to drive the stepping motor 108 by a drive amount corresponding to the rotational operation amount of the manual focus ring 130 detected by the focus encoder 131 to drive the focus lens 104, thereby performing MF (manual focus).

The aperture stop unit 114 includes stop blades 114a and 114b. An open-and-close state of the stop blades 114a and 114b is detected by a hall element 115, and a detection result thereof is input to the lens microcomputer 111 through an amplifier 122 and an A/D converter 123. The lens microcomputer 111 outputs, depending on the input detection result from the A/D converter 123, a stop drive signal to a stop driver 121 so as to cause the stop driver 121 to drive a stop actuator 113, thereby controlling a light amount control operation of the aperture stop unit 114.

The interchangeable lens 100 further includes a shake sensor (not illustrated and hereinafter referred to as "a gyro sensor") constituted by a vibration gyro or the like. The lens microcomputer 111 drives an image-stabilizing actuator 126 constituted by a voice coil motor or the like through an image-stabilizing driver 125 depending on a shake (angular velocity) detected by the gyro sensor, thereby performing an image-stabilizing process to control the movement of the image-stabilizing lens 103. Prior to the driving of the image-stabilizing actuator 126, a lock mechanism that holds the image-stabilizing lens 103 at its initial position is released.

The camera body 200 includes an image sensor 201 constituted by a CCD sensor, a CMOS sensor or the like, an A/D converter 202, a signal processor 203, a recorder (memory) 204, the camera microcomputer 205 and a display unit 206. The image sensor 201 photoelectrically converts an object image formed by the image-capturing optical system in the interchangeable lens 100 to output an image-capturing signal as an analog electrical signal.

The A/D converter 202 converts the analog image-capturing signal from the image sensor 201 into a digital image-capturing signal. The signal processor 203 performs various image processes on the digital image-capturing signal from the A/D converter 202 to produce a video signal. The signal processor 203 produces, from the video signal, focus information indicating a contrast state of the object image (that is, a focus state of the image-capturing optical system) and luminance information indicating an exposure state. The signal processor 203 outputs the video signal to the display unit 206. The display unit 206 displays the video signal as a live-view image used for checking an image-capturing composition and the focus state. In addition, the signal processor 203 outputs the video signal to the recorder 204. The recorder 204 records the video signal.

A memory 210 is constituted by, for example, a DDR (Double Data Rate SDRAM). The memory 210 stores the digital image-capturing signal obtained using the image sensor 201 and the video signal produced by the image processor 203 and stores the lens data received from the lens microcomputer 111.

The camera microcomputer 205 as a camera controller controls the camera body 200 (for example, performs image-capturing control) in response to inputs from a camera operation unit 207 including an image-capturing instructing switch and various setting switches (not illustrated). The camera microcomputer 205 transmits, in response to a user's operation of a zoom switch (not illustrated), the control command relating to the magnification-varying operation of the magnification-varying lens 102 to the lens microcomputer 111 through a camera data transceiver 208b.

Moreover, the camera microcomputer 205 transmits, to the lens microcomputer 111 through the camera data transceiver 208b, the control command relating to the light amount control operation of the aperture stop unit 114 depending on the luminance information and the control command relating to the focusing operation of the focus lens 104 depending on the focus information. The camera microcomputer 205 performs operations relating to the communication with the lens microcomputer 111 according to a camera communication control program as a computer program.

Figure 2:
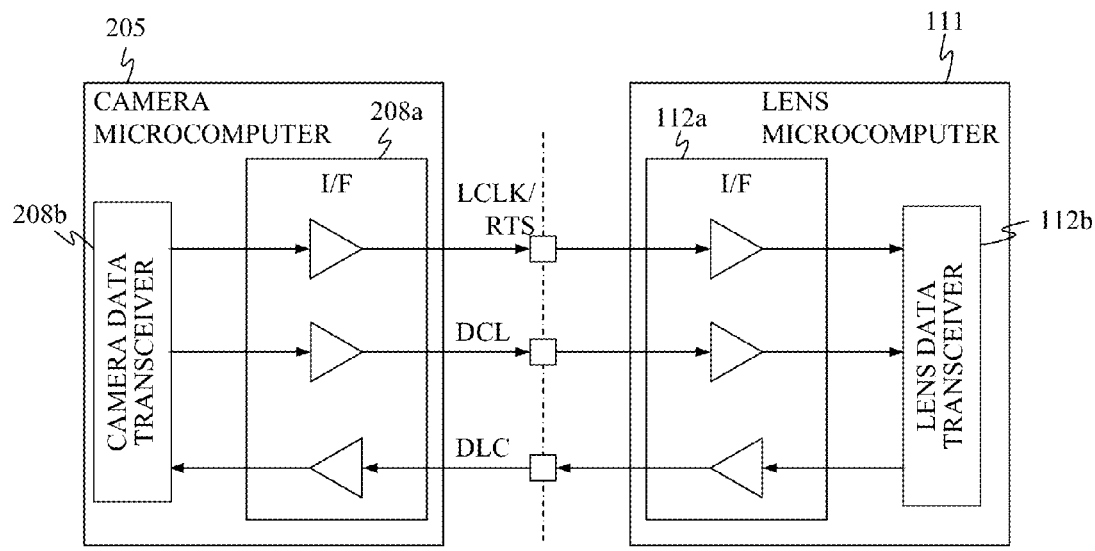
FIG. 2 is a block diagram illustrating a configuration of a communication circuit in Embodiment 1.

Next, with reference to FIG. 2, description will be made of a communication circuit constituted between the camera body 200 (camera microcomputer 205) and the interchangeable lens 100 (lens microcomputer 111) and of the communication performed therebetween. The camera microcomputer 205 has a function of managing settings for the communication with the lens microcomputer 111 and a function of providing notices such as the transmission requests. On the other hand, the lens microcomputer 111 has a function of producing lens data and a function of transmitting the lens data.

The camera microcomputer 205 includes a camera communication interface circuit 208a, and the lens microcomputer 111 includes a lens communication interface circuit 112a. The camera microcomputer 205 (camera data transceiver 208b) and the lens microcomputer 111 (lens data transceiver 112b) communicate with each other through the communication terminals (illustrated by three boxes) provided in the mount 300 and the camera and lens communication interface circuits 208a and 112a. In this embodiment, the camera and lens microcomputers 205 and 111 perform three-wire asynchronous serial communication using three channels. The camera data transceiver 208b and the camera communication interface circuit 208a constitute the camera communicator 208. The lens data transceiver 112b and the lens communication interface circuit 112a constitute the lens communicator 112.

The three channels are a transmission request channel as a communication request channel, a first data communication channel and a second data communication channel. The transmission request channel is used for providing the notices such as the transmission requests (transmission instructions) for the lens data and switch requests (switch instructions) for communication processes described later, from the camera microcomputer 205 to the lens microcomputer 111. The provision of the transmission request is performed by switching a signal level (voltage level) on the transmission request channel between High as a first level and Low as a second level. A transmission request signal provided to the transmission request channel is hereinafter referred to as "a request-to-send signal RTS".

The first data communication channel is used for transmitting the lens data from the lens microcomputer 111 to the camera microcomputer 205. The lens data transmitted as a signal from the lens microcomputer 111 to the camera microcomputer 205 through the first data communication channel is hereinafter referred to as "a lens data signal DLC". The second data communication channel is used for transmitting camera data from the camera microcomputer 205 to the lens microcomputer 111. The camera data transmitted as a signal from the camera microcomputer 205 to the lens microcomputer 111 through the second data communication channel is hereinafter referred to as "a camera data signal DCL".

The request-to-send signal RTS is provided from the camera microcomputer 205 as a communication master to the lens microcomputer 111 as a communication slave.

The camera data signal DCL includes various control commands and transmission request commands transmitted from the camera microcomputer 205 to the lens microcomputer 111. The lens data signal DLC includes various lens data transmitted from the lens microcomputer 111 to the camera microcomputer 205.

The camera and lens microcomputers 205 and 111 set their communication speed beforehand and perform the communication (transmission and receipt) at a communication bit rate according to this setting. The communication bit rate indicates a data amount transferable per second and is expressed with a unit of bps (bits per second). The camera and lens microcomputers 205 and 111 communicate with each other by a full-duplex communication method enabling mutual transmission and receipt of data.

Figure 3:
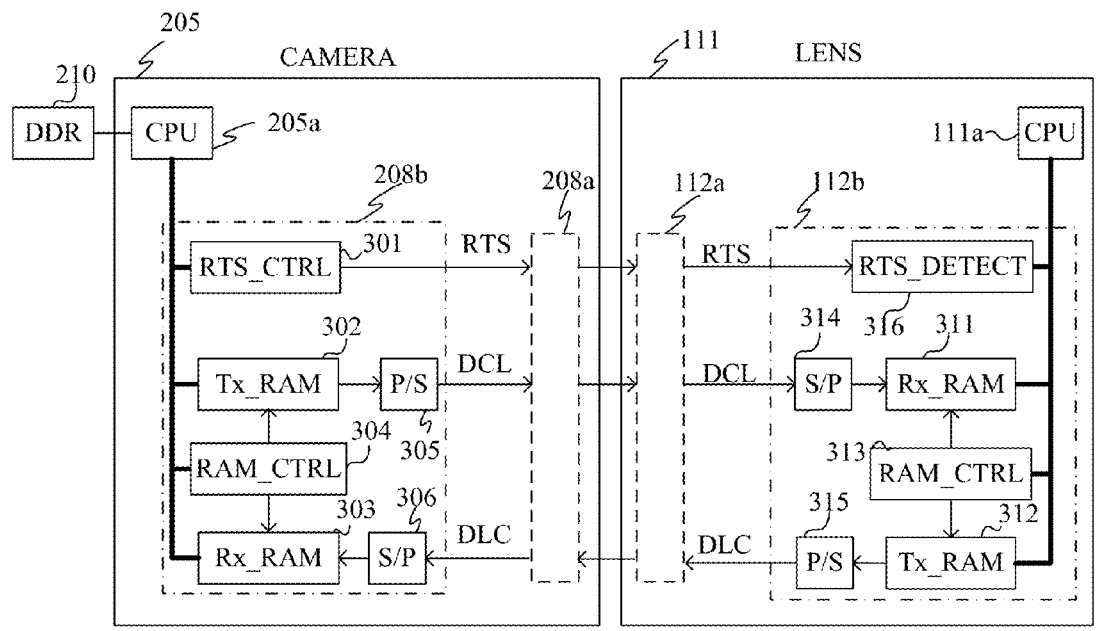
FIG. 3 is a block diagram illustrating a configuration of a lens data transceiver in Embodiment 1.

FIG. 3 illustrates a configuration of the camera data transceiver 208b in the camera microcomputer 205 and the lens data transceiver 112b in the lens microcomputer 111. The camera microcomputer 205 includes a CPU 205a as a core of the camera microcomputer 205, an RTS controller 301 and a transmission data buffer 302 as a camera data buffer constituted by a RAM or the like. The camera microcomputer 205 further includes a receipt data buffer 303 constituted by a RAM or the like and a buffer controller 304 that controls data storing and data read-out to and from the buffers 302 and 303.

On the other hand, the lens microcomputer 111 includes a CPU 111a as a core of the lens microcomputer 111, an RTS detector 316 and a receipt data buffer 311 constituted by a RAM or the like. The camera microcomputer 205 further includes a transmission data buffer 312 as an accessory data buffer constituted by a RAM or the like and a buffer controller 313 that controls data storing and data read-out to and from the buffers 311 and 312.

The camera data signal DCL to be transmitted from the camera microcomputer 205 to the lens microcomputer 111 is stored to the transmission data buffer 302. For example, when the camera data signal DCL of 128 bytes is transmitted, this camera data signal DCL of 128 bytes is first stored to the transmission data buffer 302 and then is transmitted to the lens microcomputer 111. The buffer controller 304 reads out the camera data signal DCL byte by byte (frame by frame) from the transmission data buffer 302. The read camera data signal DCL of each byte is converted from a parallel data signal into a serial data signal by the parallel-serial converter 305 and is transmitted from the camera microcomputer 205 to the lens microcomputer 111 through the second data communication channel.

The camera data signal DCL transmitted from the camera microcomputer 205 is converted from the serial data signal into a parallel data signal by the serial-parallel converter 314 in the lens microcomputer 111.

The buffer controller 313 stores the camera data signal DCL converted into the parallel data signal to the receipt data buffer 311.

The lens data signal DLC to be transmitted from the lens microcomputer 111 to the camera microcomputer 205 is stored to the transmission data buffer 312. For example, when the lens data signal DLC of 128 bytes is transmitted, this lens data signal DLC of 128 bytes is first stored to the transmission data buffer 312 and then is transmitted to the camera microcomputer 205. The buffer controller 313 reads out the lens data signal DLC byte by byte (frame by frame) from the transmission data buffer 312. The read lens data signal DLC of each byte is converted from a parallel data signal into a serial data signal by the parallel-serial converter 315 and is transmitted from the lens microcomputer 111 to the camera microcomputer 205 through the first data communication channel.

The lens data signal DLC transmitted from the lens microcomputer 111 is converted from the serial data signal into a parallel data signal by the serial-parallel converter 306 in the camera microcomputer 205. The buffer controller 304 stores the lens data signal DLC converted into the parallel data signal to the receipt data buffer 303. The lens data signal DLC stored in the receipt data buffer 303 is read out therefrom by the camera CPU 205a, and the read lens data signal DLC is transferred and stored to the memory 210.

In response to transmission of commands for requesting operations from the camera microcomputer 205 to the lens microcomputer 111 through the above communication process, the lens microcomputer 111 controls the actuators (107, 108, 113 and others) corresponding to the operation request commands.

The camera microcomputer 205 and the lens microcomputer 111 normally perform a first communication process as a first process, which will be described later.

Furthermore, the camera microcomputer 205 and the lens microcomputer 111 are capable of selectively performing the first communication process and a second communication process as a second process.

In the second communication process, operation results obtained by the control of the actuators are transmitted from the lens microcomputer 111 to the camera microcomputer 205 without delay (in real time).

Although this embodiment is describing a case of performing three-wire asynchronous serial communication using the transmission request channel (RTS), the first data communication channel (DLC) and the second data communication channel (DCL), three-channel clock-synchronous serial communication may be performed. This case needs to provide, as channels used for the communication between the camera body and the interchangeable lens, a clock channel for clock signals, a data communication channel for communicating the lens and camera data signals, and a transmission request channel different from these clock and data communication channels.

Figure 4A:
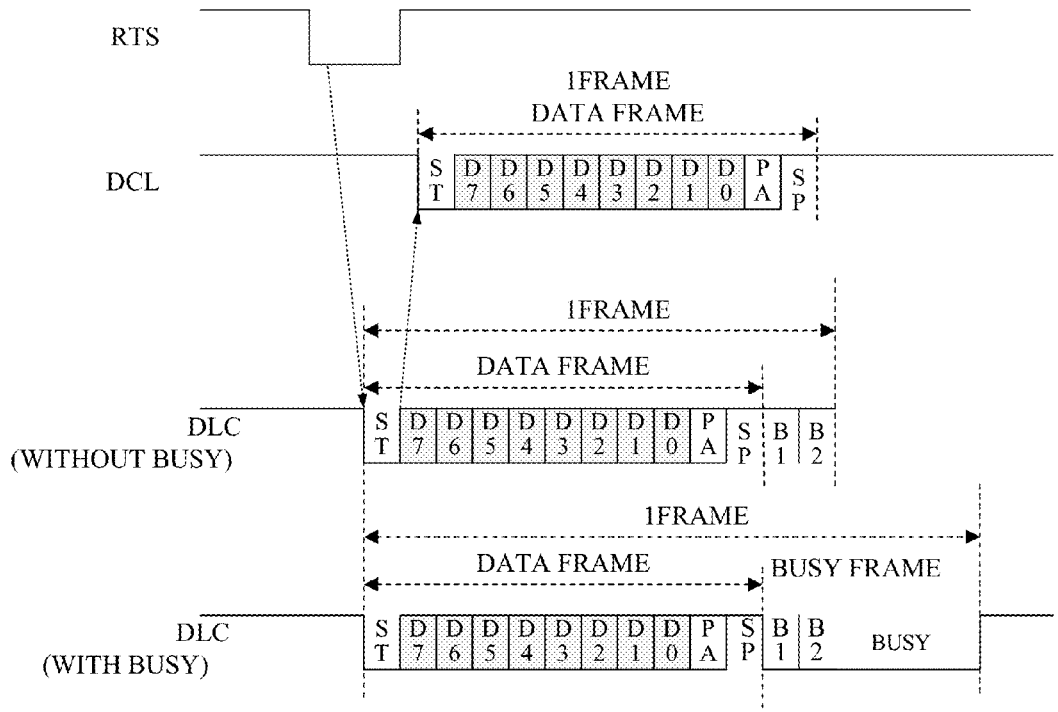
FIGS. 4A to 4C illustrate waveforms of signals communicated between a camera body and an interchangeable lens in a first communication process in Embodiment 1.
Figure 4B:
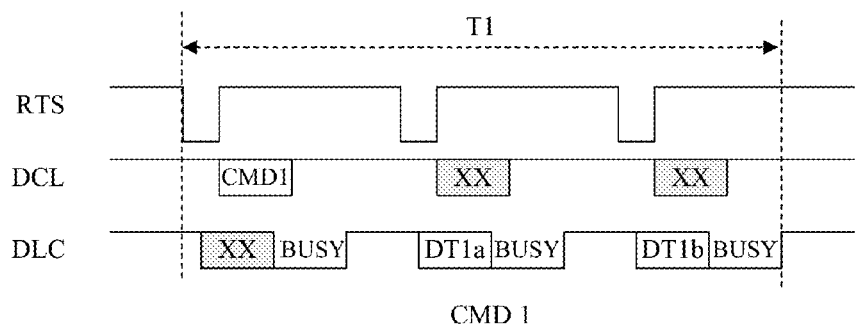
Figure 4C:
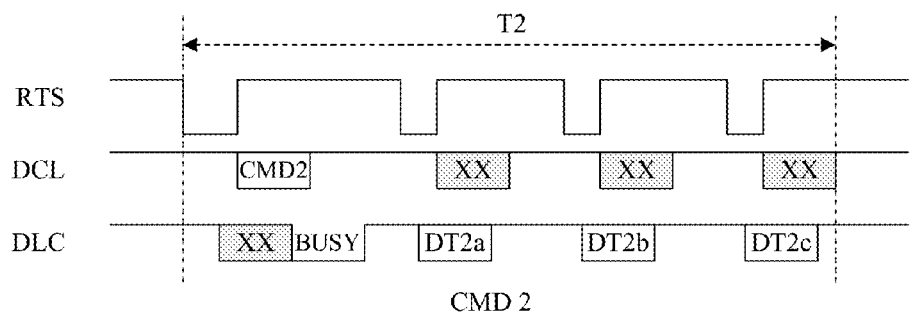

FIGS. 4A to 4C illustrates waveforms of signals transmitted and received between the camera and lens microcomputers 205 and 111 in the first communication process. An arrangement of procedures of the signal transmission and receipt is called a communication protocol. The first communication process includes a communication mode (hereinafter referred to as "a BUSY addition mode") in which a BUSY frame is added, and another communication mode (hereinafter referred to as "a non-BUSY addition mode") in which the BUSY frame is not added.

FIG. 4A illustrates signal waveforms of one frame as a minimum communication unit. The camera data signal DCL and the lens data signal DLC have mutually different parts in their data formats in the one frame.

First, description will be made of the data format of the lens data signal DLC. The lens data signal DLC in the one frame includes, as large parts, a data frame as a first frame and a BUSY frame as a subsequent frame. A signal level of the lens data signal DLC is held at High in a non-transmission state where data transmission is not performed.

The lens microcomputer 111 sets the signal level to Low in one bit time period in order to provide a notice of a start of one frame transmission of the lens data signal DLC to the camera microcomputer 205. The one bit time period indicating a start of one frame is called "a start bit ST" in this embodiment. That is, one data frame is started from this start bit ST. The start bit ST is provided as a head bit of each one frame of the lens data signal DLC.

Next, the lens microcomputer 111 transmits one-byte lens data in 8 bit time period from a subsequent second bit to a ninth bit.

The data bits are arranged in an MSB-first format starting from a highest-order data bit D7 and continuing to data bits D6, D5, D4, D3, D2 and D1 in this order and ending with a lowest-order data bit D0. Then, the lens microcomputer 111 adds one bit parity information (parity bit) PA at a tenth bit and sets the signal level of the lens data signal DLC to High in a time period of a stop bit SP indicating an end of the one frame. Thus, the data frame starting from the start bit SP ends.

Thereafter, as illustrated by "DLC (WITH BUSY)" in FIG. 4A, the lens microcomputer 111 adds the BUSY frame after the stop bit SP. The BUSY frame indicates a time period of a communication standby request BUSY as a notice (hereinafter referred to as "a BUSY notice") from the lens microcomputer 111 to the camera microcomputer 205. The lens microcomputer 111 holds the signal level of the lens data signal DLC to Low until terminating the BUSY notice.

On the other hand, for a case where the BUSY notice is unnecessary to be provided from the lens microcomputer 111 to the camera microcomputer 205, as illustrated by "DLC (WITHOUT BUSY)" in FIG. 4A, a data format is provided that forms one frame without adding the BUSY notice (BUSY frame). That is, the lens microcomputer 111 can select as the data format of the lens data signal DLC, depending on a process situation, one to which the BUSY notice is added and one to which the BUSY notice is not added.

Description will be made of a method of determining the presence and absence of the BUSY notice; the method is performed by the camera microcomputer 205. In FIG. 4A, the signal waveform of "DLC (WITHOUT BUSY)" and the signal waveform of "DLC (WITH BUSY)" both include bit positions B1 and B2. The camera microcomputer 205 selects one of these bit positions B1 and B2 as a BUSY determination position P for determining the presence and absence of the BUSY notice. As just described, this embodiment employs a data format that selects the BUSY determination position P from the bit positions B1 and B2. This data format enables addressing a problem that a process time from the transmission of the data frame of the lens data signal DLC until the determination of the presence of the BUSY notice (the lens data signal DLC is set to Low) is changed depending on a processing performance of the lens microcomputer 111. Whether to select the bit position B1 or B2 as the BUSY determination position P is set by the communication between the camera and lens microcomputers 205 and 111 before the data communication therebetween is performed. The BUSY determination position P is not necessary to be fixed at the bit position B1 or B2 and may be changed depending on processing capabilities of the camera and lens microcomputers 205 and 111.

FIG. 4B illustrates signal waveforms in a case of performing continuous communication in the BUSY addition mode illustrated by "DLC (with BUSY)" in FIG. 4A.

The BUSY notice (BUSY frame) from the lens microcomputer 111 is provided using the lens data signal DLC through the first data communication channel, and a subsequent communication is started after the BUSY notice is terminated. In FIG. 4B, CMD1 represents a transmission request command that is transmitted as the camera data signal DCL from the camera microcomputer 205 to the lens microcomputer 111. The lens microcomputer 111 transmits, in response to receiving this transmission request command CMD1, lens data signals DT1 (DT1a and DT1b) of two bytes corresponding to the transmission request command CMD1 to the camera microcomputer 205.

FIG. 4C illustrates signal waveforms in a case of performing communication with switching the communication setting (communication mode) between the BUSY addition mode and the non-BUSY addition mode. In an example of FIG. 4C, the communication is first performed in the BUSY addition mode and then performed in the non-BUSY addition mode. In FIG. 4C, CMD2 represents a control command and a transmission request command that are transmitted as the camera data signal DCL from the camera microcomputer 205 to the lens microcomputer 111. Although FIG. 4C illustrates a case where the camera microcomputer 205 transmits the control and transmission request commands in one frame, the control and transmission request commands may be transmitted in mutually separate frames.

The lens microcomputer 111 switches, in response to receiving the control command in the command CMD2, the communication mode (communication settings) from the BUSY addition mode to the non-BUSY addition mode. Then, the lens microcomputer 111 transmits, in response to receiving the transmission request command in the command CMD2, the lens data signals DT2 (DT2a to DT2c) of three bytes, which corresponds to the transmission request command, to the camera microcomputer 205.

Next, description will be made of a data format of the camera data signal DCL. Specifications of the data format of the camera data signal DCL in one frame are common to those of the lens data signal DLC. However, the addition of the BUSY frame to the camera data signal DCL is prohibited, which is different from the lens data signal DLC.

Next, the communication procedures between the camera and lens microcomputers 205 and 111 in the first communication process will be described.

The camera microcomputer 205 sets, when an event for starting the communication with the lens microcomputer 11 is generated, a signal level of the request-to-send signal RTS to Low (in other words, asserts the request-to-send signal RTS) to provide the transmission request to the lens microcomputer 111. The lens microcomputer 111 having detected the transmission request through the assertion (Low) of the request-to-send signal RTS performs a process to produce the lens data signal DLC to be transmitted to the camera microcomputer 205. Then, after a preparation for transmitting the lens data signal DLC is completed, the lens microcomputer 111 starts transmitting one byte (frame) of the lens data signal DLC through the first data communication channel.

The lens microcomputer 111 starts the transmission of the lens data signal DLC within a time period mutually set by the camera and lens microcomputers 205 and 111 after the assertion of the request-to-send signal RTS. That is, for the lens microcomputer 111, a strict restriction is not provided that it is necessary to set the lens data to be transmitted before a first clock pulse is input thereto in a time period from the assertion of the request-to-send signal RTS to a start of the transmission of the lens data signal DLC.

Next, in response to detecting the start bit ST as a head bit of the data frame of the lens data signal DLC received from the lens microcomputer 111 (that is, in response to a start of receiving the lens data signal DLC), the camera microcomputer 205 returns the signal level of the request-to-send signal RTS to High, in other words, negates the request-to-send signal RTS. The camera microcomputer 205 thereby terminates the transmission request after the start of the transmission of the lens data signal DLC, and starts transmission of the camera data signal DCL through the second data communication channel. The negation of the request-to-send signal RTS may be performed any one of before and after the start of the transmission of the camera data signal DCL. It is only necessary that these negation and transmission be performed until the receipt of the data frame of the lens data signal DLC is completed.

The lens microcomputer 111 having transmitted the data frame of the lens data signal DLC adds the BUSY frame to the lens data signal DLC in a case where the BUSY notice is required to be provided to the camera microcomputer 205. In a case where the BUSY notice is not is required to be provided to the camera microcomputer 205, the lens microcomputer 111 does not add the BUSY frame to the lens data signal DLC. The camera microcomputer 205 monitors the presence and absence of the BUSY notice and prohibits the assertion of the request-to-send signal RTS for a subsequent transmission request while the BUSY notice is provided.

The lens microcomputer 111 executes necessary processes in a time period where the communication from the camera microcomputer 205 is prohibited by the BUSY notice and terminates the BUSY notice after a subsequent communication preparation is completed. The assertion of the request-to-send signal RTS by the camera microcomputer 205 for the subsequent transmission request is permitted under a condition that the BUSY notice is terminated and the transmission of the data frame of the camera data signal DCL is completed.

As just described, in this embodiment, in response to the assertion of the request-to-send signal RTS upon the generation of the communication starting event in the camera microcomputer 205, the lens microcomputer 111 starts transmitting the data frame of the lens data signal DLC to the camera microcomputer 205. On the other hand, the camera microcomputer 205 starts, in response to detecting the start bit ST of the lens data signal DLC, transmitting the data frame of the camera data signal DCL to the lens microcomputer 111. The lens microcomputer 111 adds, as needed, the BUSY frame to the data frame of the lens data signal DLC for providing the BUSY notice and then terminates the BUSY notice to end one frame communication process. In this communication process, the camera microcomputer 205 and the lens microcomputer 111 mutually transmit and receive one byte data.

Next, description will be made of the second communication process (second process) in which the camera microcomputer 205 acquires, when transmitting the operation request command to the lens microcomputer 111, information indicating a change in status of the interchangeable lens 100 without delay, with reference to FIG. 5. In the following description, the status of the interchangeable lens 100 is referred to as "a lens status". Prior to this description, commands communicated between the camera microcomputer 205 and the lens microcomputer 111 (that is, communication commands) are defined as shown in following Table 1. In the following description, the information indicating the change in lens status is referred to as "lens status change information".

TABLE 1

| COMMUNICATION COMMAND EXAMPLE 1 | | |
|---|---|---|
| DCL | 0xAA (STATUS CHANGE NOTICE REQUEST) | 0x01 (DETECTION TARGET DESIGNATION) |
| DLC | Don't care | Don't care |
| COMMUNICATION COMMAND EXAMPLE 2 | | |
| DCL | 0xBB (FOCUS DRIVE REQUEST) | 0x55 (FOCUS DRIVE AMOUNT) |
| DLC | Don't care | Don't care |
| COMMUNICATION COMMAND EXAMPLE 3 | | |
| DCL | Don't care | Don't care |
| DLC | 0xCC (STATUS CHANGE NOTICE RESPONSE) | 0x01 (DETECTION TARGET DESIGNATION) |

Data of a first byte in the camera data signal DCL shown in Communication command example 1 is a status change notice request command as an operation request command requesting the lens microcomputer 111 from the camera microcomputer 205 to switch from the first communication process to the second communication process.

This status change notice request command is, for example, 0xAA in hexadecimal notation. Data of a second byte in the status change notice request command is a detection target designation command designating a detection target in the interchangeable lens 100 whose lens status change information indicating its status change should be transmitted from the lens microcomputer 111 to the camera microcomputer 205.

Multiple detection target commands are each expressed in a bit string as shown in Table 2. For example, "bit 0" designates stop of driving of focus lens 104 (in other words, stop of focus drive), "bit 1" designates stop of driving of the aperture stop unit 114 (in other words, stop of aperture stop drive), and "bit 2" designates release of locking of an image stabilization mechanism (image-stabilizing lens 103). The detection target commands are not limited to those shown in Table 2, and one detection target command may designate multiple detection targets. When one detection target command designates multiple detection targets, the detection target command may be expressed in multiple bytes depending on the number of the detection targets.

TABLE 2

| DETECTION TARGET DESIGNATION | |
|---|---|
| Bit 0 | STOP OF FOCUS DRIVE |
| Bit 1 | STOP OF APERTURE STOP DRIVE |
| Bit 2 | RELEASE OF LOCKING OF IMAGE-STABILIZING LENS |
| Bit 3 | . . . |
| Bit 4 | . . . |
| Bit 5 | . . . |
| Bit 6 | . . . |
| Bit 7 | . . . |

Data of a first byte transmitted in the camera data signal DLC shown in Communication command example 2 is a focus drive request command (0xBB) that is an operation request command requesting the lens microcomputer 111 from the camera microcomputer 205 to perform the focus drive as a predetermined operation. Furthermore, data of a second byte subsequent to the focus drive request command is a focus drive amount command (0x55) designating a drive amount of the focus lens 104.

Figure 5:
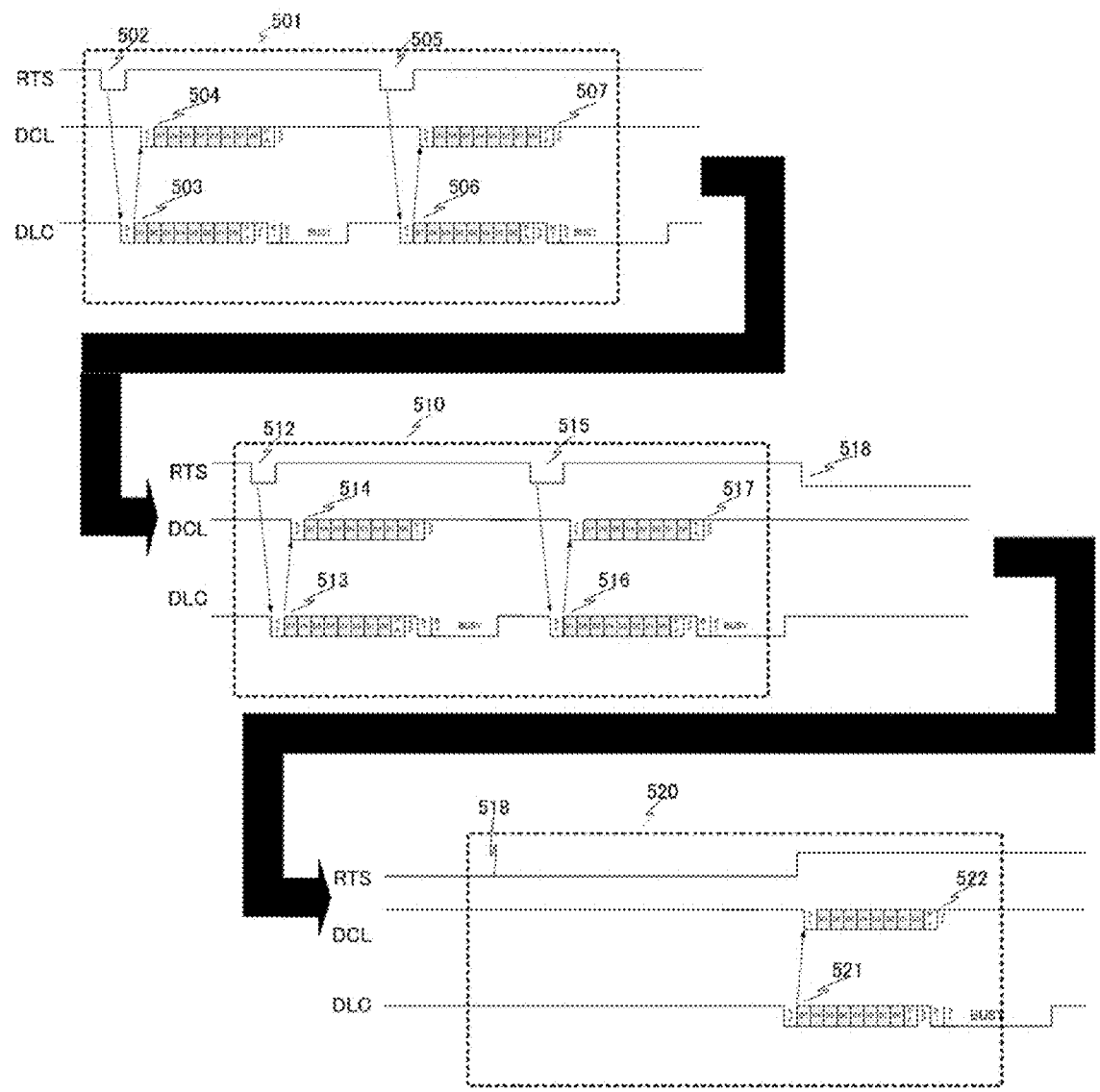
FIG. 5 illustrates a second communication process in Embodiment 1.

FIG. 5 illustrates a communication process in which the camera data signals DCL shown in Communication command examples 1 and 2 are transmitted to the lens microcomputer 111, and the lens data signals DLC are transmitted from the lens microcomputer 111 to the camera microcomputer 205.

In FIG. 5, a part surrounded by a broken line frame 501 indicates a communication of two bytes in the first communication process described with reference to FIG. 4A. When the camera microcomputer 205 asserts the request-to-send signal RTS (502), the lens microcomputer 111 transmits a one byte lens data signal (DLC) 503 to the camera microcomputer 205 through the first data communication channel. As this lens data signal 503, any data may be transmitted as shown by "Don't care" in Communication command example 1 in Table 1. After transmitting the above lens data signal 503 to the camera microcomputer 205, the lens microcomputer 111 adds the BUSY frame to the lens data signal 503 during a period where the lens microcomputer 111 performs its process.

On the other hand, the camera microcomputer 205 negates the request-to-send signal RTS. The camera microcomputer 205 having started receiving the lens data signal 503 transmits a one-byte camera data signal (DCL) 504 to the lens microcomputer 111. This camera data signal 504 is 0xAA (status change notice request command) shown in Communication command example 1.

When the camera microcomputer 205 asserts the request-to-send signal RTS again (505) subsequently to the communication of these one-byte lens and camera data signals 503 and 504, the lens microcomputer 111 transmits a one-byte lens data signal (DLC) 506 to the camera microcomputer 205. Also as this lens data signal 506, any data may be transmitted as shown by "Don't care" in Communication command example 2 in Table 1. After transmitting the above lens data signal 506 to the camera microcomputer 205, the lens microcomputer 111 adds the BUSY frame to the lens data signal 506 during a period where the lens microcomputer 111 performs its process.

On the other hand, the camera microcomputer 205 negates the request-to-send signal RTS.

The camera microcomputer 205 having started receiving the lens data signal 506 transmits a one-byte camera data signal (DCL) 507 to the lens microcomputer 111. This camera data signal 506 is 0x01 (detection target designation command) shown in Communication command example 1; 0x01 (bit 0) indicates the stop of the focus drive.

Subsequently thereto, a communication surrounded by a broken line frame 510 is performed. This communication is also a communication of two bytes in the first communication process described with reference to FIG. 4A. when the camera microcomputer 205 asserts the request-to-send signal RTS (512), the lens microcomputer 111 transmits a one-byte lens data signal (DLC) 513 to the camera microcomputer 205 through the first data communication channel. As this lens data signal 513, any data may be transmitted as shown by "Don't care" in Communication command example 2 in Table 1. After transmitting the above lens data signal 513 to the camera microcomputer 205, the lens microcomputer 111 adds the BUSY frame to the lens data signal 513 during a period in which the lens microcomputer 111 performs its process. On the other hand, the camera microcomputer 205 negates the request-to-send signal (RTS) 512. The camera microcomputer 205 having started receiving the lens data signal 513 transmits a one-byte camera data signal (DCL) 514 to the lens microcomputer 111. This camera data signal 514 is 0xBB (status change notice request command) shown in Communication command example 2.

When the camera microcomputer 205 asserts the request-to-send signal RTS again (515) subsequently to the communication of these one-byte lens and camera data signals 513 and 514, the lens microcomputer 111 transmits a one-byte lens data signal (DLC) 516, which corresponds to first accessory data, to the camera microcomputer 205.

As this lens data signal 516, any data may be transmitted as shown by "Don't care" in Communication command example 2 in Table 1. The camera microcomputer 205 having started receiving the lens data signal 516 transmits a one-byte camera data signal (DCL) 517 to the lens microcomputer 111. This camera data signal 517 is 0x55 (focus drive amount command) shown in Communication command example 2. The focus drive mount indicates a number of drive pulses of the stepping motor 108 that drives the focus lens 104.

The camera microcomputer 205 having performed the communication surrounded by the broken line frame 510 asserts the request-to-send signal RTS (518) and keeps the request-to-send signal RTS asserted. On the other hand, the lens microcomputer 111 starts monitoring the stop of the focus drive, which is designated by the camera data signal 507 from the camera microcomputer 205. Thereafter, until the lens microcomputer 111 stops driving of the stepping motor 108 (that is, stops the focus drive), the request-to-send signal RTS is kept asserted as illustrated in a broken line frame 520.

The lens microcomputer 111, which has detected the stop of the focus drive while the request-to-send signal RTS is kept asserted, immediately transmits a lens data signal (DLC) 521 corresponding to second accessory data to the camera microcomputer 205 as a process at a part surrounded by the broken line frame 520. This lens data signal (DLC) 521 is 0x01 (bit 0) indicating the stop of the focus drive, as shown in Communication command example 3. The camera microcomputer 205 can thereby recognize a time at which the focus drive is stopped without delay. The camera microcomputer 205 having started receiving the lens data signal (DLC) 521 transmits the camera data signal (DCL) to the lens microcomputer 111. As this camera data signal, any data may be transmitted as shown by "Don't care" in Communication command example 3 in Table 1. For example, the camera microcomputer 205 may transmit receipt acknowledgement (ACK) data.

Figure 6A:
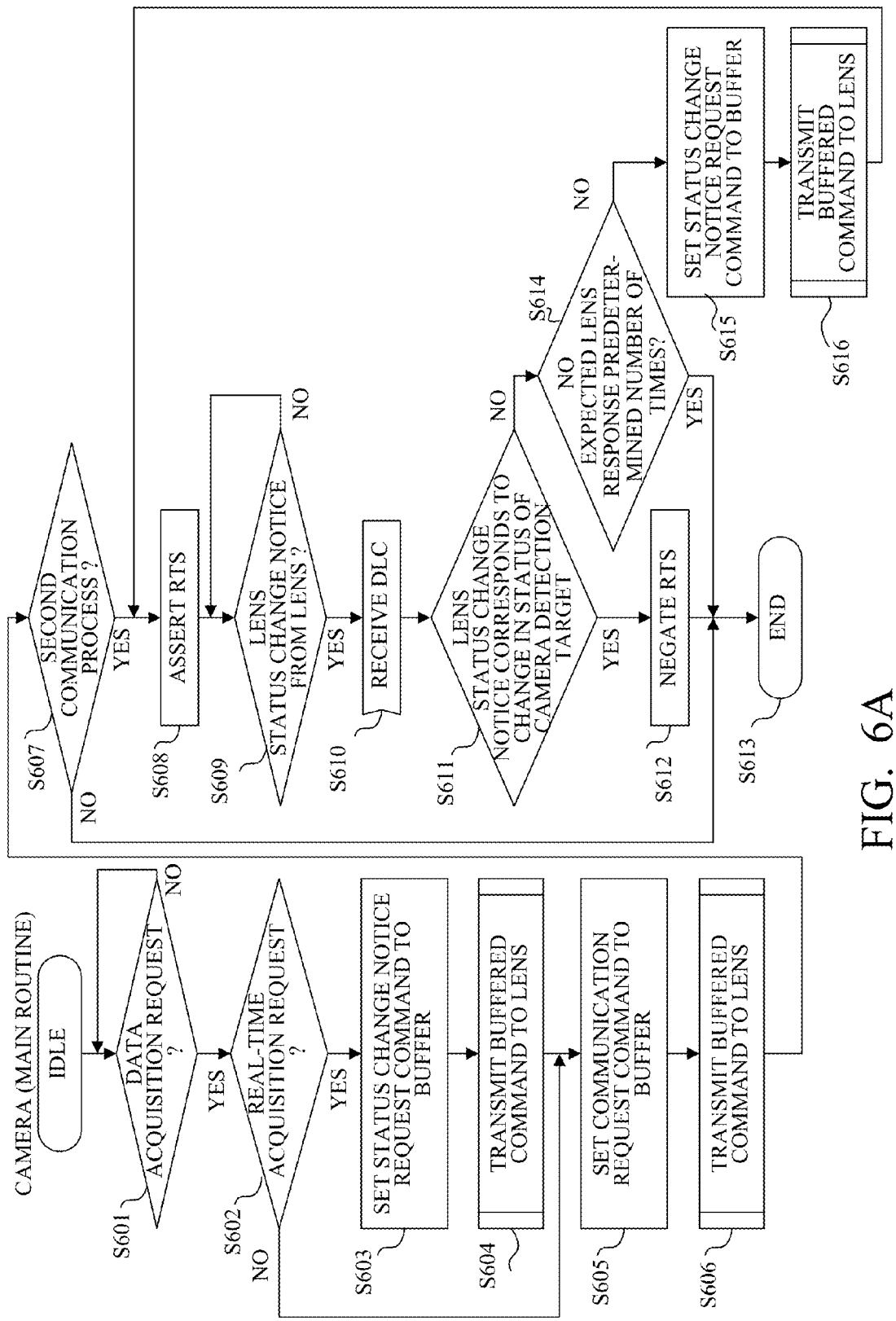
FIGS. 6A and 6B illustrate a process performed by a camera microcomputer in the second communication process in Embodiment 1.
Figure 6B:
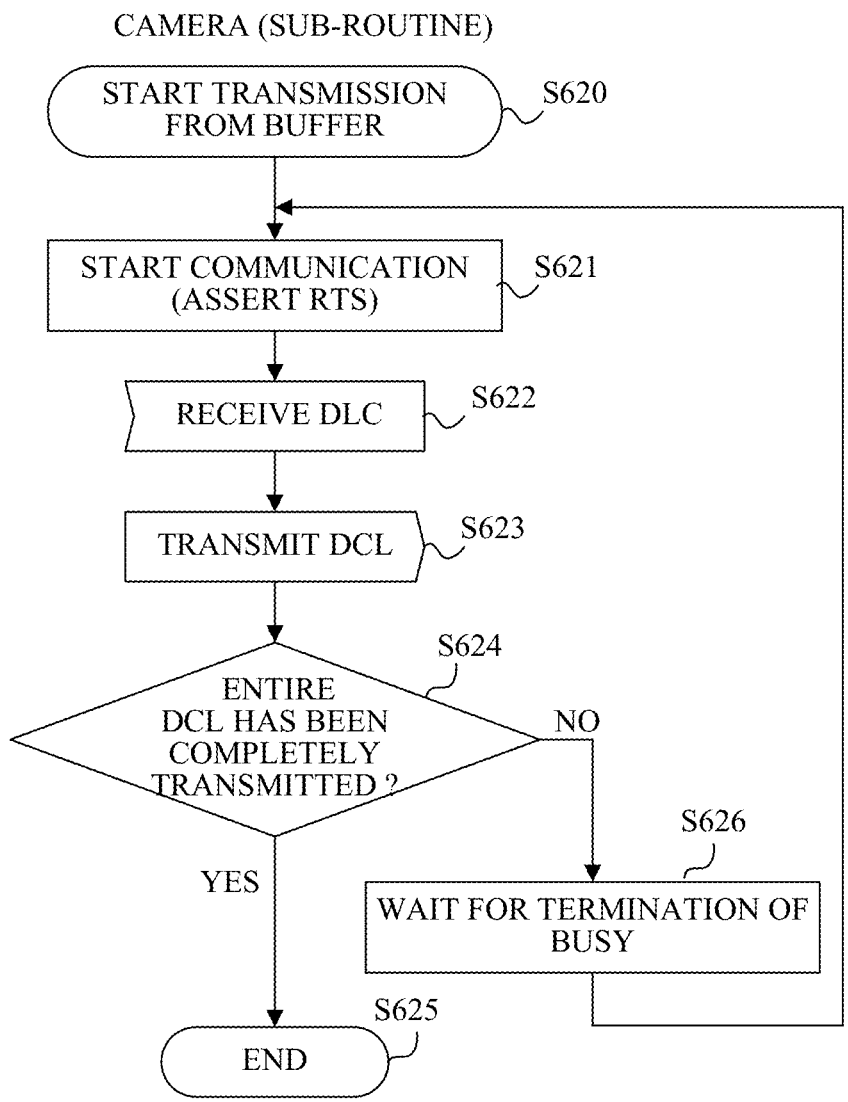
Figure 7A:
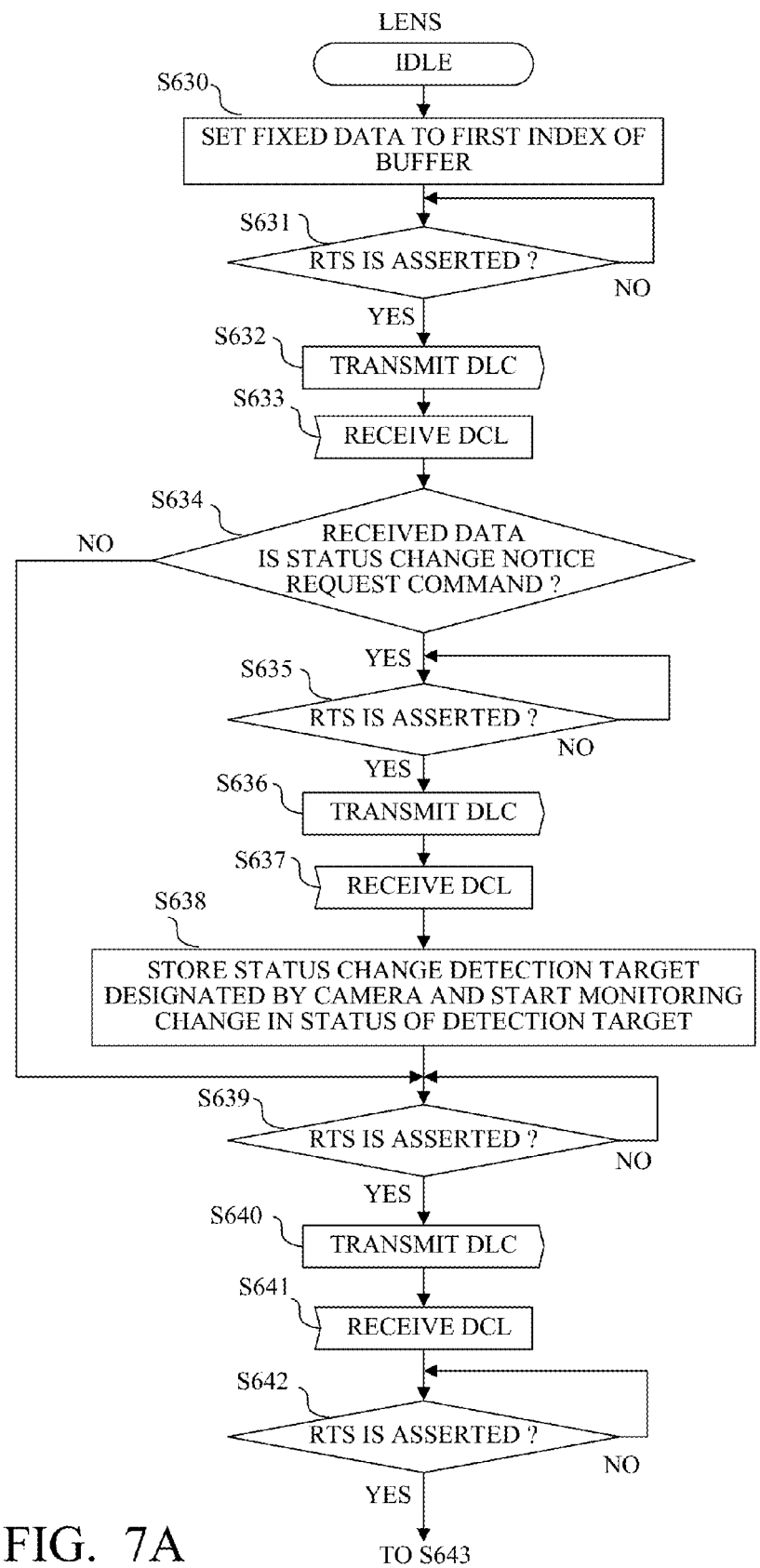
FIGS. 7A and 7B illustrate a process performed by a lens microcomputer in the second communication process in Embodiment 1.
Figure 7B:
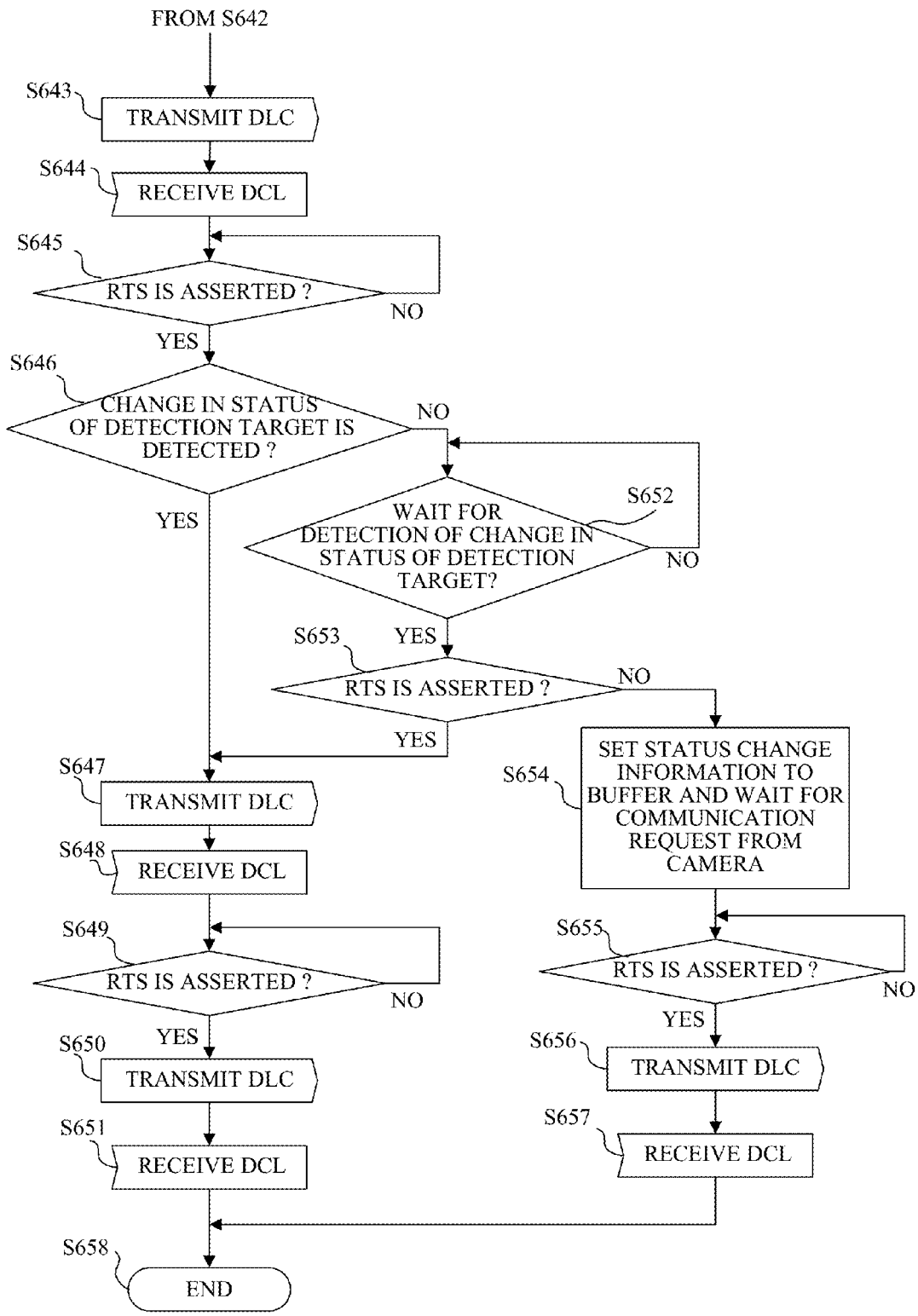

Next, with reference to flowcharts of FIGS. 6A, &B, 7A and 7B, description will be made of the communication processes described with reference to FIG. 5 and performed by the camera and lens microcomputers 205 and 111. FIGS. 6A and 6B illustrate the process performed by the camera microcomputer 205, and FIGS. 7A and 7B illustrate the process performed by the lens microcomputer 111. The camera and lens microcomputers 205 and 111 each perform the process according to the above-mentioned communication control program. In FIGS. 6A, 6B, 7A and 7B (and flowcharts in other drawings), "S" represents a step.

At step 601 in FIG. 6A, the camera microcomputer 205 determines whether or not a data acquisition request is provided from any functional module (such as the signal processor 203) in the camera body 200. If the data acquisition request is provided, the camera microcomputer 205 proceeds to step 602, and otherwise repeats the determination at step 601.

At step 602, the camera microcomputer 205 determines whether or not the data acquisition request from the functional module is one that requires detecting a change in lens status without delay, that is, in real time (the data acquisition request is hereinafter referred to as "a real-time acquisition request"). If the data acquisition request is the real-time acquisition request, the camera microcomputer 205 proceeds to step 603. If the data acquisition request is not the real-time acquisition request, but a normal data acquisition request, the camera microcomputer 205 proceeds to 605 to perform the first communication process. The normal data acquisition request requests data not requiring real-time information on the change in lens status; for example, a request for optical data of the interchangeable lens 100, which is to be acquired, for example, after the interchangeable lens 100 is attached to the camera body 200.

At step 603, the camera microcomputer 205 sets, to the transmission data buffer 302 in order to perform the second communication process, a two-byte camera data signal DCL including the status change notice request command (0xAA) and the detection target designation command (0x01).

Next, at step 604, the camera microcomputer 205 transmits, to the lens microcomputer 111, the two-byte camera data signal DCL set to the transmission data buffer 302.

Description will be made of a process (sub-routine process) for transmitting and receiving multiple-byte camera data signal DCL set to the transmission data buffer 302 with reference to FIG. 6B.

The camera microcomputer 205 having started this process at step 620 in FIG. 6B asserts the request-to-send signal RTS at step 621 to request the lens microcomputer 111 to start communication.

At step 622, the lens microcomputer 111 transmits a one-byte lens data signal DLC to the camera microcomputer 205.

Next, at step 623, the camera microcomputer 205 transmits, in response to receiving the lens data signal DLC from the lens microcomputer 111 at step 622, a one-byte camera data signal DCL to the lens microcomputer 111.

Next, at step 624, the camera microcomputer 205 determines whether or not the entire camera data signal DCL set to the transmission buffer 302 has been completely transmitted to the lens microcomputer 111. If the entire camera data signal DCL has been completely transmitted, the camera microcomputer 205 proceeds to step 625. If the entire camera data signal DCL has not been completely transmitted, the camera microcomputer 205 proceeds to step 626 to wait for the BUSY notice of the lens data signal DLC to be terminated, and then proceeds to step 621.

In the above-described sub-routine process, the multiple-byte camera data signal DCL is transmitted and received, which enables notifying the lens microcomputer 111 that the camera body 200 provides the real-time acquisition request.

Returning to FIG. 6A, at step 605, the camera microcomputer 205 sets the operation request command for the lens microcomputer 111 to the transmission data buffer 302.

For example, the camera microcomputer 205 sets, to the transmission data buffer 302, a two-byte camera data signal DCL including the focus drive request command (0xBB) and the focus drive amount command (0x55) shown in Communication command example 2 in Table 1.

Next, at step 606, the camera microcomputer 205 transmits the two-byte camera data signal DCL set to the transmission data buffer 302 at step 605 to the lens microcomputer 111 by the process illustrated in FIG. 6B. The camera microcomputer 205 thereby instructs the focus drive by a predetermined drive amount to the lens microcomputer 111.

Next, at step 607, the camera microcomputer 205 determines whether to perform the second communication process in order to acquire information on stop of the focus drive in real time or perform the first communication process. Specifically, when increasing speeds of the AF control and the image-capturing control, the camera microcomputer 205 performs the second communication process. When performing the second communication process, the camera microcomputer 205 proceeds to step 608. When performing the first communication process, the camera microcomputer 205 proceeds to step 613 to end this process. In order to detect the change in lens status when performing the first communication process, it is necessary for the camera microcomputer 205 as the communication master to cyclically acquire the lens status from the lens microcomputer 111 as the communication slave Next at step 608, the camera microcomputer 205 asserts the request-to-send signal RTS to wait for a response (lens data signal DLC) from the lens microcomputer 111.

Next at step 609, the camera microcomputer 205 waits for receiving a lens status change notice including the lens status change information from the lens microcomputer 111. At this step, in response to receiving from the lens microcomputer 111 a one-byte lens data signal DLC as the status change notice response command (0xCC) shown in Communication command example 3 in Table 1, the camera microcomputer 205 proceeds to step 610.

At step 610, the camera microcomputer 205 receives from the lens microcomputer 111 the detection target designation command (0x01) shown in Communication command example 3 in Table 1.

Next at step 611, the camera microcomputer 205 determines whether or not the lens status change information received at step 610 corresponds to expected lens status change information, that is, information indicating stop of the focus drive. In a normally communicable environment, this determination result always shows a correspondence therebetween. However, abnormal data due to communication noise may result in non-correspondence therebetween. If the determination result shows the correspondence therebetween, the camera microcomputer 205 proceeds to step 612, and otherwise proceeds to step 614.

At step 612, the camera microcomputer 205 negates the request-to-send signal RTS, and then proceeds to step 613 to end this process.

On the other hand, at step 614, the camera microcomputer 205 performs a communication retry control for acquiring the lens status change information. If not acquiring the lens status change information even though having performed the communication retry control a predetermined number of times, the camera microcomputer 205 regards this situation as a communication failure and proceeds to step 612. In this situation, the communication between the camera microcomputer 205 and the lens microcomputer 111 is abnormal, so that the camera microcomputer 205 repeats a predetermined error restoration process such as a predetermined negotiation process with the lens microcomputer 111. If having not performed the communication retry control the predetermined number of times, the camera microcomputer 205 proceeds to step 615.

At steps 615 and 616, the camera microcomputer 205 transmits again, as well as at steps 603 and 604, a two-byte camera data signal DCL including the status change notice request command (0xAA) and the detection target designation command (0x01) to the lens microcomputer 111, and then returns to step 608. On the other hand, at step 630 in FIG. 7A, the lens microcomputer 111 stores a first byte of the lens data signal DLC to be transmitted as a response to the communication request from the camera microcomputer 205, as fixed data to a first index region of the transmission data buffer 312. This fixed data is transmitted as dummy data ("Don't care") to the camera microcomputer 205 before the lens microcomputer 111 analyzes the communication command from the camera microcomputer 205.

Next at step 631, the lens microcomputer 111 determines whether or not the request-to-send signal RTS is asserted by the camera microcomputer 205. If the request-to-send signal RTS is asserted, the lens microcomputer 111 proceeds to step 632. If the request-to-send signal RTS is not asserted, the lens microcomputer 111 repeats the determination at step 631. At step 632, the lens microcomputer 111 transmits the first byte ("Don't care") of the lens data signal DLC, which has been set to the transmission data buffer 312 at step 630, to the camera microcomputer 205.

Next at step 633, the lens microcomputer 111 receives a first byte of the camera data signal DCL from the camera microcomputer 205. Specifically, the lens microcomputer 111 receives the status change notice request command (0xAA) from the camera microcomputer 205. Next at step 634, the lens microcomputer 111 determines whether or not the data received at step 633 is the status change notice request command. If the received data is the status change notice request command, the lens microcomputer 111 proceeds to step 635. If the received data is not the status change notice request command, but a normal communication command, the lens microcomputer 111 proceeds to step 639. At step 635, the lens microcomputer 111 waits for the request-to-send signal RTS to be asserted by the camera microcomputer 205, and proceeds to step 636 in response to the assertion. At step 636, the lens microcomputer 111 transmits, to the camera microcomputer 205, the dummy data ("Don't care") stored as the fixed data in the first index region of the transmission data buffer 312, as a second byte of the lens data signal DLC.

Next at step 637, the lens microcomputer 111 receives a first byte of the camera data signal DCL from the camera microcomputer 205. Specifically, the lens microcomputer 111 receives the detection target designation command (0x01) from the camera microcomputer 205. Next at step 638, the lens microcomputer 111 starts a monitor process for monitoring a change in status of the detection target (that is, a change in lens status) corresponding to the detection target designation command received from the camera microcomputer 205 at step 637. Specifically, the lens microcomputer 111 starts monitoring stop of the focus drive. At step 639, the lens microcomputer 111 waits for the request-to-send signal RTS to be asserted by the camera microcomputer 205, and proceeds to step 640 in response to the assertion.

At step 640, the lens microcomputer 111 transmits the above-described dummy data ("Don't care") to the camera microcomputer 205 as a one-byte lens data signal DLC. At this step, since the lens microcomputer 111 does not receive the operation request command from the camera microcomputer 205, the lens microcomputer 111 transmits the dummy data to the camera microcomputer 205.

Next at step 641, the lens microcomputer 111 receives the focus drive request command (0xBB) from the camera microcomputer 205 as a first byte of the camera data signal DCL. Next at step 642, the lens microcomputer 111 waits for the request-to-send signal RTS to be asserted by the camera microcomputer 205, and proceeds to step 643 in response to the assertion. At step 643, the lens microcomputer 111 transmits the above-described dummy data ("Don't care") to the camera microcomputer 205 as a first byte of the lens data signal DLC. Next at step 644, the lens microcomputer 111 receives the focus drive amount command (0x55) from the camera microcomputer 205 as a second byte of the camera data signal DCL.

Next at step 645, the lens microcomputer 111 waits for the request-to-send signal RTS to be asserted by the camera microcomputer 205, and proceeds to step 646 in response to the assertion. At step 646, the lens microcomputer 111 determines whether or not the monitor process started at step 638 has detected the change in status of the detection target, that is, the stop of the focus drive. If the monitor process has detected the stop of the focus drive, the lens microcomputer 111 proceeds to step 647, and otherwise proceeds to step 652. At step 647, the lens microcomputer 111 transmits the status change notice request command (0xCC) as a first byte of the lens data signal DLC to the camera microcomputer 205. In response to receiving this status change notice request command, the camera microcomputer 205 performs, at steps 609 and 610 in FIG. 6A, the transmission process for the two-byte camera data signal DCL. Next at step 648, the lens microcomputer 111 receives the dummy data ("don't care") transmitted from the camera microcomputer 205 as a first byte of the camera data signal DCL. Next at step 649, the lens microcomputer 111 waits for the request-to-send signal RTS to be asserted by the camera microcomputer 205, and proceeds to step 650 in response to the assertion. At step 650, the lens microcomputer 111 transmits, to the camera microcomputer 205, data indicating the stop of the focus drive (0x01) as a second byte of the lens data signal DLC.

Next at step 651, the lens microcomputer 111 receives the dummy data ("Don't care") transmitted from the camera microcomputer 205 as a second byte of the camera data signal DLC. At this step, the camera microcomputer 205 may transmit, instead of the dummy data, 0xCC that is the first byte of the lens data signal DLC or 0x01 that is the second byte thereof to the lens microcomputer 111 as ACK data without change. Then, the lens microcomputer 111 proceeds to step 658 to end this process. On the other hand, at step 652, the lens microcomputer 111 waits for the change in status of the detection target (that is, the stop of the focus drive) to be detected, and proceeds to step 653 in response to the detection. At step 653, the lens microcomputer 111 determines whether or not the request-to-send signal RTS is asserted by the camera microcomputer 205. If the request-to-send signal RTS is asserted, the lens microcomputer 111 performs the processes at steps 647 to 651, and then proceeds to step 658 to end this process. If the request-to-send signal RTS is not asserted, the lens microcomputer 111 proceeds to step 654. At step 654, the lens microcomputer 111 sets the data (0x01) indicating the stop of the focus drive detected at step 652 to the transmission data buffer 312.

Then, at next step 655, the lens microcomputer 111 waits for the request-to-send signal RTS to be asserted by the camera microcomputer 205. In response to the assertion of the request-to-send signal RTS, the lens microcomputer 111 proceeds to step 656. At step 656, the lens microcomputer 111 transmits, to the camera microcomputer 205, the one-byte lens data signal DLC (0x01) set to the transmission data buffer 312 at step 654. Next at step 657, the lens microcomputer 111 receives the dummy data ("Don't care") as the camera data signal DCL transmitted from the camera microcomputer 205. At this step, the camera microcomputer 205 may transmit instead of the dummy data, the ACK data to the lens microcomputer 111. Then, the lens microcomputer 111 proceeds to step 658 to end this process.

As described above, in this embodiment, if the request-to-send signal RTS is asserted when detecting the change in status of the detection target (that is, the change in lens status) designated by the camera microcomputer 205, the lens microcomputer 111 immediately transmits the lens status change information indicating the lens status to the camera microcomputer 205. On the other hand, if the request-to-send signal RTS is negated when detecting the change in lens status, the lens microcomputer 111 transmits the lens status change information to the camera microcomputer 205 as a response to the status change notice request command transmitted at a subsequent time from the camera microcomputer 205. In this embodiment, when the camera microcomputer (communication master) 205 transmits an operation request such as the focus drive request to the lens microcomputer (communication slave) 111, the lens microcomputer 111 notifies the camera microcomputer 205 of the change in status of the detection target relating to the operation request without delay.

Therefore, as compared with a case where the lens microcomputer 111 detects the change in status of the detection target at a predetermined cycle and notifies the camera microcomputer 205 of the change, it is possible to reduce a delay of notifying the camera microcomputer 205 of the change in status of the detection target.

Embodiment 2

Embodiment 1 described the case where the lens microcomputer 111 detects the change in one lens status (stop of the focus drive), and in response thereto transmits the lens status change information to the camera microcomputer 205. Such changes in lens status include, start and stop of the focus drive, start and stop of the aperture stop drive, start and stop of an image-stabilizing operation, transition to an image-stabilizable state, and start and stop of zoom drive. The camera microcomputer 205 often requires acquiring information indicating these changes in lens status in real time. For example, when performing the image-capturing (release) control, acquiring information indicating both stop of the focus drive and stop of the aperture stop drive in real time enables improving image-capturing response.

Thus, a second embodiment (Embodiment 2) of the present invention enables the lens microcomputer 111 to transmit information indicating multiple changes in lens status to the camera microcomputer 205 without delay (that is, in real time). Communication commands in this embodiment are shown in Table 3 below.

TABLE 3

| COMMUNICATION COMMAND EXAMPLE 4 | | |
|---|---|---|
| DCL | 0xAA (STATUS CHANGE NOTICE REQUEST) | 0x03 (DETECTION TARGET DESIGNATION) |
| DLC | Don't care | Don't care |
| COMMUNICATION COMMAND EXAMPLE 5 | | |
| DCL | 0xBB (FOCUS DRIVE REQUEST) | 0x55 (FOCUS DRIVE AMOUNT) |
| DLC | Don't care | Don't care |
| COMMUNICATION COMMAND EXAMPLE 6 | | |
| DCL | 0xDD (APERTURE STOP DRIVE REQUEST) | 0x33 (APERTURE STOP DRIVE AMOUNT) |
| DLC | Don't care | Don't care |
| COMMUNICATION COMMAND EXAMPLE 7 | | |
| DCL | Don't care | Don't care |
| DLC | 0xCC (STATUS CHANGE NOTICE REQUEST) | 0x02 (DETECTION TARGET DESIGNATION) |
| COMMUNICATION COMMAND EXAMPLE 8 | | |
| DCL | Don't care | Don't care |
| DLC | 0xCC (STATUS CHANGE NOTICE REQUEST) | 0x01 (DETECTION TARGET DESIGNATION) |

Figure 8A:
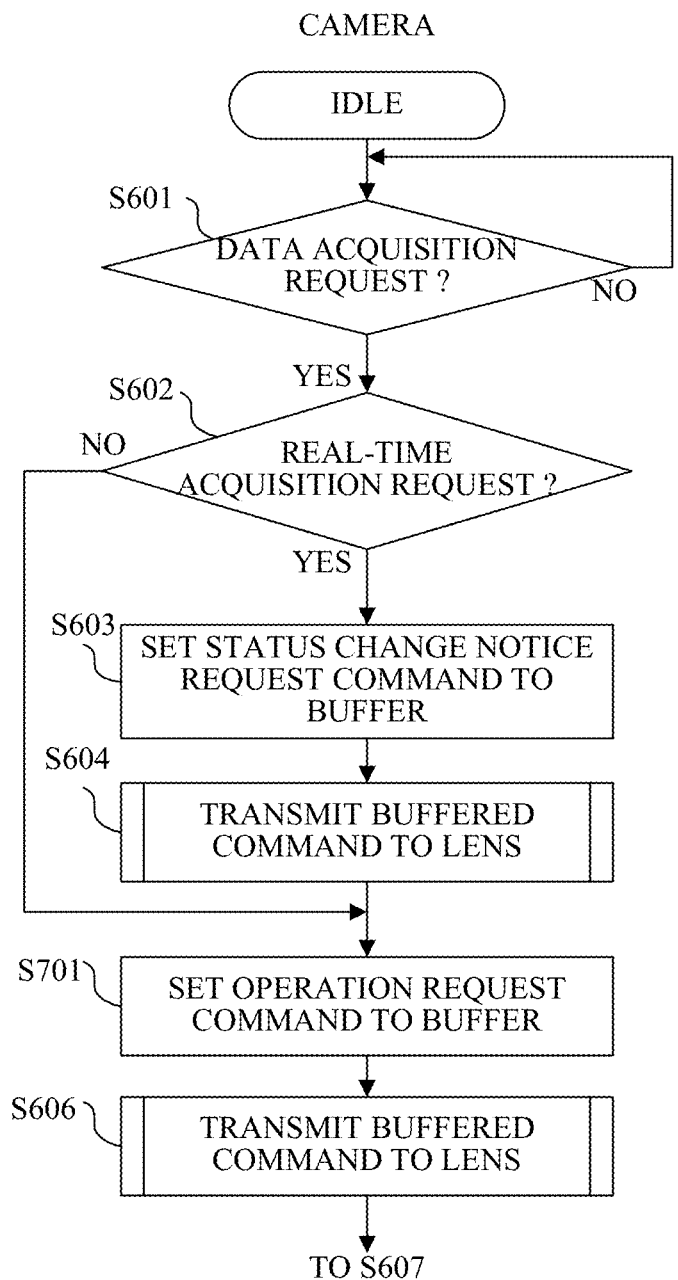
FIGS. 8A and 8B illustrate a process performed by the camera microcomputer in a second communication process in Embodiment 2 of the present invention.
Figure 8B:
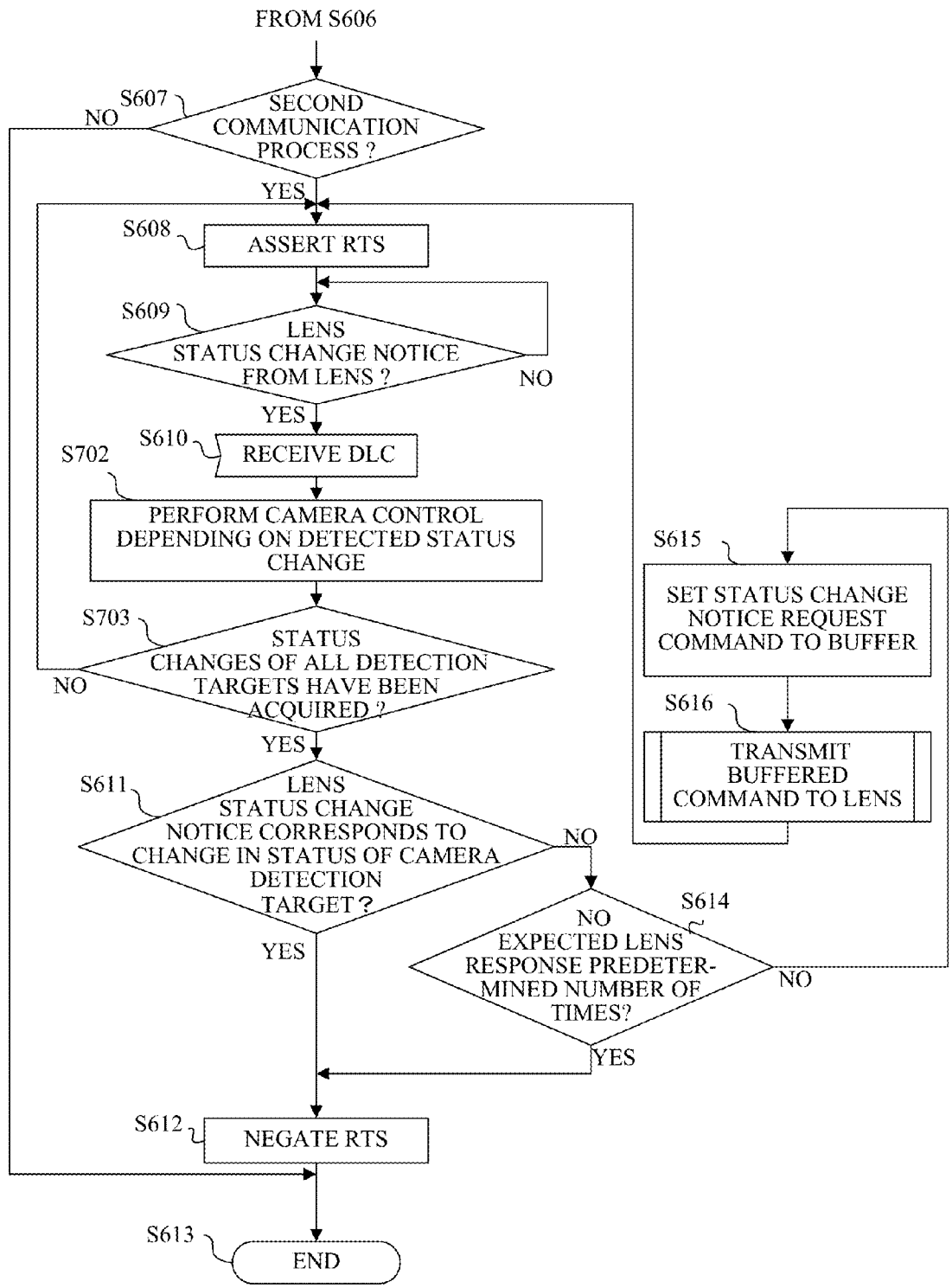

A first communication process in this embodiment is the same as that described in Embodiment 1 with reference to FIG. 5, so that description thereof is omitted. A second communication process in this embodiment will be described with reference to flowcharts of FIGS. 8A, 8B, 9A and 9B. First, a communication process performed by the camera microcomputer 205 will be described with reference to FIGS. 8A and 8B. Steps 601, 602, 604 and 606 to 616 in FIGS. 8A and 8B are the same as those in Embodiment 1 (FIG. 6A), so that description thereof is omitted.

At step 603, the camera microcomputer 205 sets, as a detection target designation command subsequent to a status change notice request command, a two-byte camera data signal DCL (0x03) shown in Communication command example 4 in Table 3 to the transmission data buffer 302. Specifically, the camera microcomputer 205 designates two detection targets that are stop of the focus drive and stop of the aperture stop drive. At step 701 subsequent to step 604, the camera microcomputer 205 sets, to the transmission data buffer 302, an operation request command to be transmitted to the lens microcomputer 111. Specifically, the camera microcomputer 205 sets, to the transmission data buffer 302, a four-byte camera data signal DCL including the focus drive request command (0xBB) shown in Communication command example 5 in Table 3 and the aperture stop drive request command (0xDD) shown in Communication command example 6 in Table 3.

Thereafter, the camera microcomputer 205 receives, through the processes from step 608, the lens status change notices as the lens data signals DLC indicating multiple changes in lens status from the lens microcomputer 111. At step 702, the camera microcomputer 205 performs control of the camera body 200 depending on the lens status change notice received at step 610. For example, when receiving the lens status change notice indicating the stop of the focus drive in a state where start of AF is instructed in the camera body 200, the camera microcomputer 205 performs display or sound control for indicating an in-focus state.

Figure 9A:
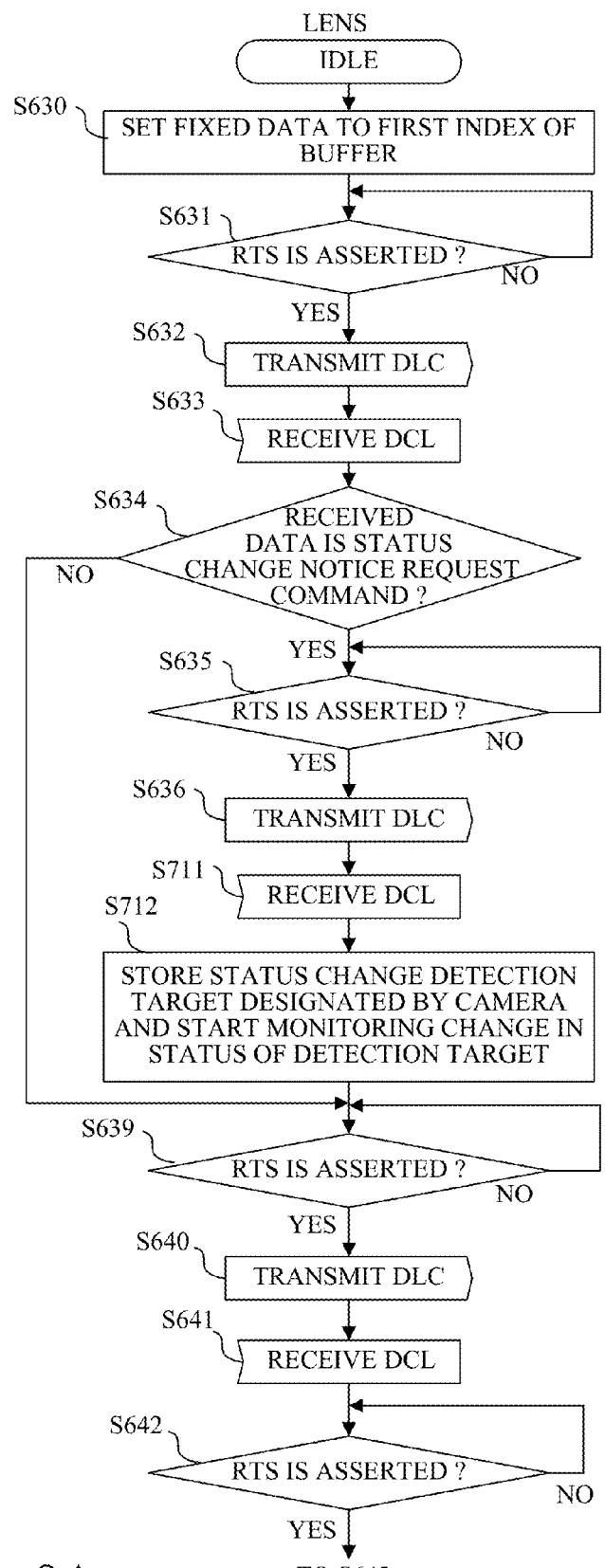
FIGS. 9A and 9B illustrate a process performed by the lens microcomputer in the second communication process in Embodiment 2.
Figure 9B:
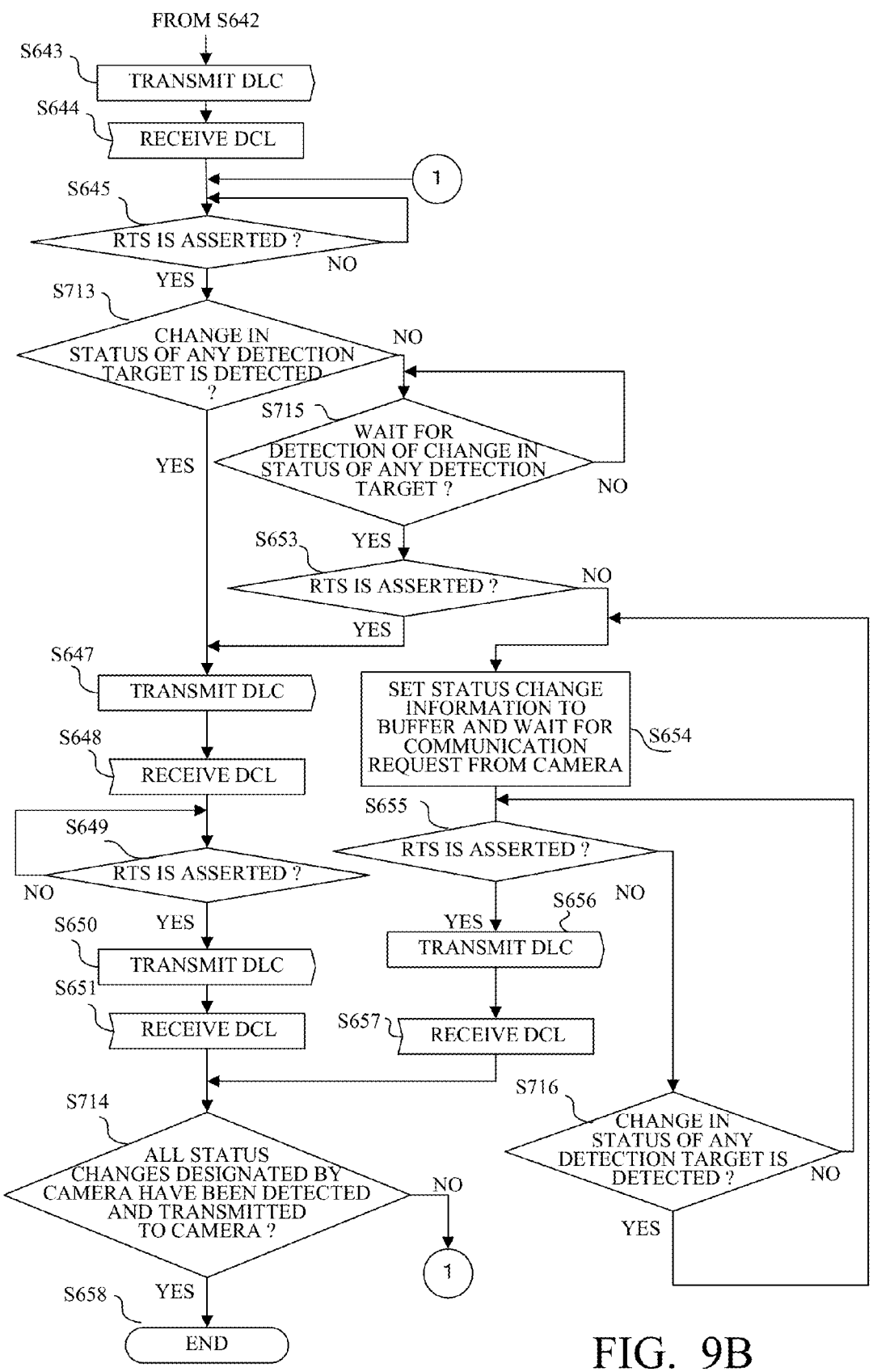

Next at step 703, the camera microcomputer 205 determines whether or not it has received from the lens microcomputer 111 the lens status change notices for all the detection targets, that is, notices indicating the stop of the focus drive and the stop of the aperture stop drive. If having received the lens status change notices for all the detection targets, the camera microcomputer 205 proceeds to step 611. If having not received the lens status change notices for all the detection targets, the camera microcomputer 205 returns to step 608 to wait for receiving a non-received lens status change notice from the lens microcomputer 111. Next, a communication process performed by the lens microcomputer 111 will be described with reference to FIGS. 9A and 9B. Steps 630 to 636 in FIG. 9A are the same as those in Embodiment 1 (FIG. 7A), so that description thereof is omitted.

At step 711 subsequent to step 636, the lens microcomputer 111 receives the two-byte camera data signal DCL from the camera microcomputer 205. Specifically, the lens microcomputer 111 receives the detection target designation command (0x03) shown in Communication command example 4 in Table 3 that designates the stop of the focus drive and stop of the aperture stop drive. Next at step 712, the lens microcomputer 111 starts a monitor process for monitoring changes in statuses of the detection targets (changes in lens status) corresponding to the detection target designation command received from the camera microcomputer 205 at step 711, that is, the stop of the focus drive and the stop of the aperture stop drive. Thereafter, the lens microcomputer 111 at steps 640 to 645 receives the operation request command transmitted from the camera microcomputer 205 to the lens microcomputer 111 as the camera data signal DCL at step 701 in FIG. 8A.

Specifically, the lens microcomputer 111 receives the four-byte camera data signal DCL including the focus drive request command (0xBB) shown in Communication command example 5 and the aperture stop drive request command (0xDD) shown in Communication command example 6. The lens microcomputer 111, which has detected at step 645 the assertion of the request-to-send signal RTS, determines at step 713 whether or not the monitor process started at step 712 has detected any change in lens status. If having detected any change in lens status, the lens microcomputer 111 proceeds to step 647. If having not detected any change in lens status, the lens microcomputer 111 proceeds to step 715.

At steps 647 to 651, the lens microcomputer 111 transmits the lens status change notice indicating the change in lens status detected at step 713 as the lens data signal DLC to the camera microcomputer 205. Then, at step 714 subsequent to step 651, the lens microcomputer 111 determines whether or not it has transmitted, to the camera microcomputer 205, the lens status change notices for all the detection targets monitored by the monitor process started at step 712. If having transmitted the lens status change notices for all the detection targets, the lens microcomputer 111 proceeds to step 658 to end this process. If having not transmitted the lens status change notices for all the detection targets, the lens microcomputer 111 proceeds to step 645 to perform a retry control.

On the other hand, at step 715, the lens microcomputer 111 waits for detecting any change in lens status. The lens microcomputer 111 having detected any change in lens status determines at next step 653 whether or not the request-to-send signal RTS is asserted. If the request-to-send signal RTS is asserted, the lens microcomputer 111 proceeds to step 647 to transmit the lens status change notice indicating the detected change in lens status as the lens data signal DLC to the camera microcomputer 205. If the request-to-send signal RTS is negated, the lens microcomputer 111 proceeds to step 654. At step 654, the lens microcomputer 111 sets the lens data signal DLC indicating the change in lens status detected at step 715 to the transmission data buffer 312.

Then, at next step 655, the lens microcomputer 111 waits for the request-to-send signal RTS to be asserted by the camera microcomputer 205. In response to the assertion of the request-to-send signal RTS, the lens microcomputer 111 proceeds to step 656. Furthermore, while waiting for the assertion of the request-to-send signal RTS, the lens microcomputer 111 determines at step 716 whether or not it has detected the change in lens status. If having detected the change in lens status, the lens microcomputer 111 returns to step 654 to add the change in lens status detected at step 716 to the lens status change notice having previously been set in the transmission data buffer 312. Then, in response to the assertion of the request-to-send signal RTS at step 655, the lens microcomputer 111 at step 656 transmits the lens status change notice set in the transmission data buffer 312 as the lens data signal DLC to the camera microcomputer 205.

In this embodiment, when the camera microcomputer 205 transmits multiple operation requests such as the focus drive request and the aperture stop drive request to the lens microcomputer 111, the lens microcomputer 111 notifies the camera microcomputer 205 of the changes in statuses of the detection targets relating to the operation requests without delay. Therefore, as compared with a case where the lens microcomputer 111 detects the multiple changes in statuses of the detection targets at a predetermined cycle and notifies the camera microcomputer 205 of the changes, it is possible to reduce a delay of notifying the camera microcomputer 205 of the changes in status of the detection targets.

Embodiment 3

Embodiment 1 enables the lens microcomputer 111, by the assertion of the request-to-send signal RTS being kept by the camera microcomputer 205, to transmit the lens status change notice to the camera microcomputer 205 without delay. In this communication format, as described with reference to FIG. 4A, the camera microcomputer 205 asserts the request-to-send signal RTS and thereby causes the lens microcomputer 111 to start transmitting the lens data signal DLC, and then can transmit the camera data signal DCL to the lens microcomputer 111. Thereafter, in order that the camera microcomputer 205 may transmit another camera data signal DCL to the lens microcomputer 111, the camera microcomputer 205 needs to negate the request-to-send signal RTS once and assert it again. Therefore, while the camera microcomputer 205 keeps the request-to-send signal RTS asserted so as to wait for receiving the lens status change notice as described in Embodiment 1, the camera microcomputer 205 cannot transmit another camera data signal DCL (for example, another operation request command) to the lens microcomputer 111. Thus, in a third embodiment (Embodiment 3) of the present invention, in a case where, while the camera microcomputer 205 keeps the request-to-send signal RTS asserted, it becomes necessary to transmit another camera data signal DCL to the lens microcomputer 111, the camera microcomputer 205 temporarily discontinues the assertion of the request-to-send signal RTS.

First, a brief description will be made of a communication process in this embodiment with reference to FIG. 10. Reference numerals 501 to 518 in FIG. 10 denote the same as those in Embodiment 1 (FIG. 5), and description thereof is omitted. The camera microcomputer 205 keeps the request-to-send signal RTS asserted (518) to wait for receiving the lens status change notice from the lens microcomputer 111, that is, wait for the second communication process. A camera data signal (DCL) 517 corresponds to first camera data.

Figure 10:
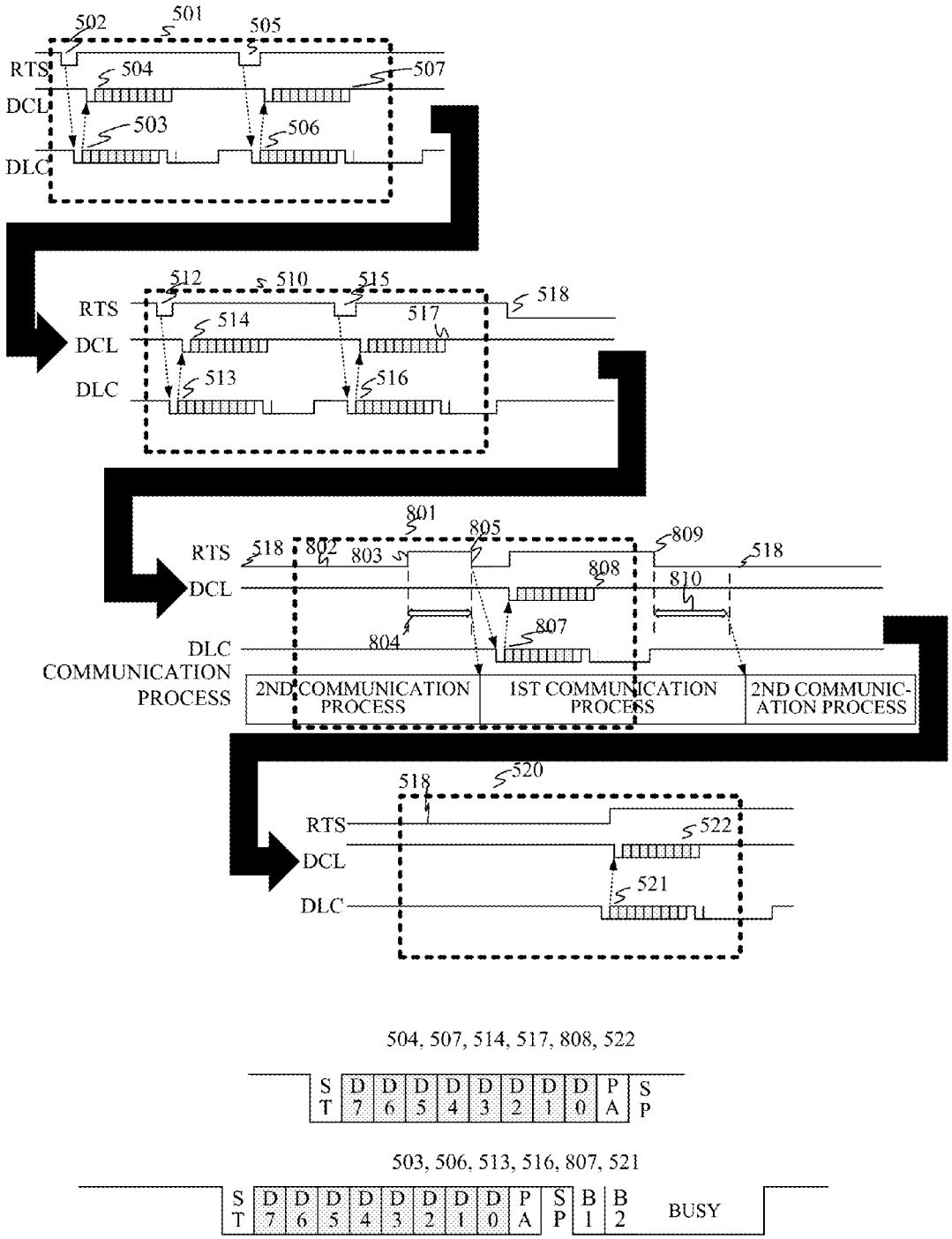
FIG. 10 illustrates a second communication process in Embodiment 3.

In FIG. 10, a part surrounded by a broken line frame 801 indicates a process in which the camera microcomputer 205 temporarily discontinues a process for waiting for receiving the lens status change notice and then transmits another operation request command to the lens microcomputer 111. The camera microcomputer 205 negates the request-to-send signal RTS (811) that has been asserted, keeps the request-to-send signal RTS negated for a predetermined time 804, and then asserts the request-to-send signal RTS again (805). The camera microcomputer 205 notifies the lens microcomputer 111, by keeping the request-to-send signal RTS negated for the predetermined time 804, of the discontinuation of the process (second communication process) for waiting for receiving the lens status change notice. The camera and lens microcomputers 205 and 111 make such a rule beforehand.

In response to the request-to-send signal RTS being kept negated for the predetermined time 804 and then being asserted, the lens microcomputer 111 switches its communication process from the second communication process to the first communication process. The camera microcomputer 205 thereby discontinues the process for waiting for receiving the lens status change notice, and after starting receiving a lens data signal (DLC) 807 from the lens microcomputer 111, transmits another operation command (DCL) 808 to the lens microcomputer 111.

The lens data signal (DLC) 807 corresponds to third accessory data, and the other operation command 808 corresponds to second camera data.

The camera microcomputer 205 having performed the process surrounded by the broken line frame 801 asserts the request-to-send signal RTS (809) again so as to restart the process for waiting for receiving the lens status change notice. In response to the request-to-send signal RTS being kept asserted for a predetermined time 810, the lens microcomputer 111 restarts a process (second communication process) for transmitting the lens status change notice to the camera microcomputer 205. The camera microcomputer 205 thereby restarts the process for waiting for receiving the lens status change notice, and performs the process surrounded by the broken line frame 520 described in Embodiment 1 (FIG. 5).

Figure 11A:
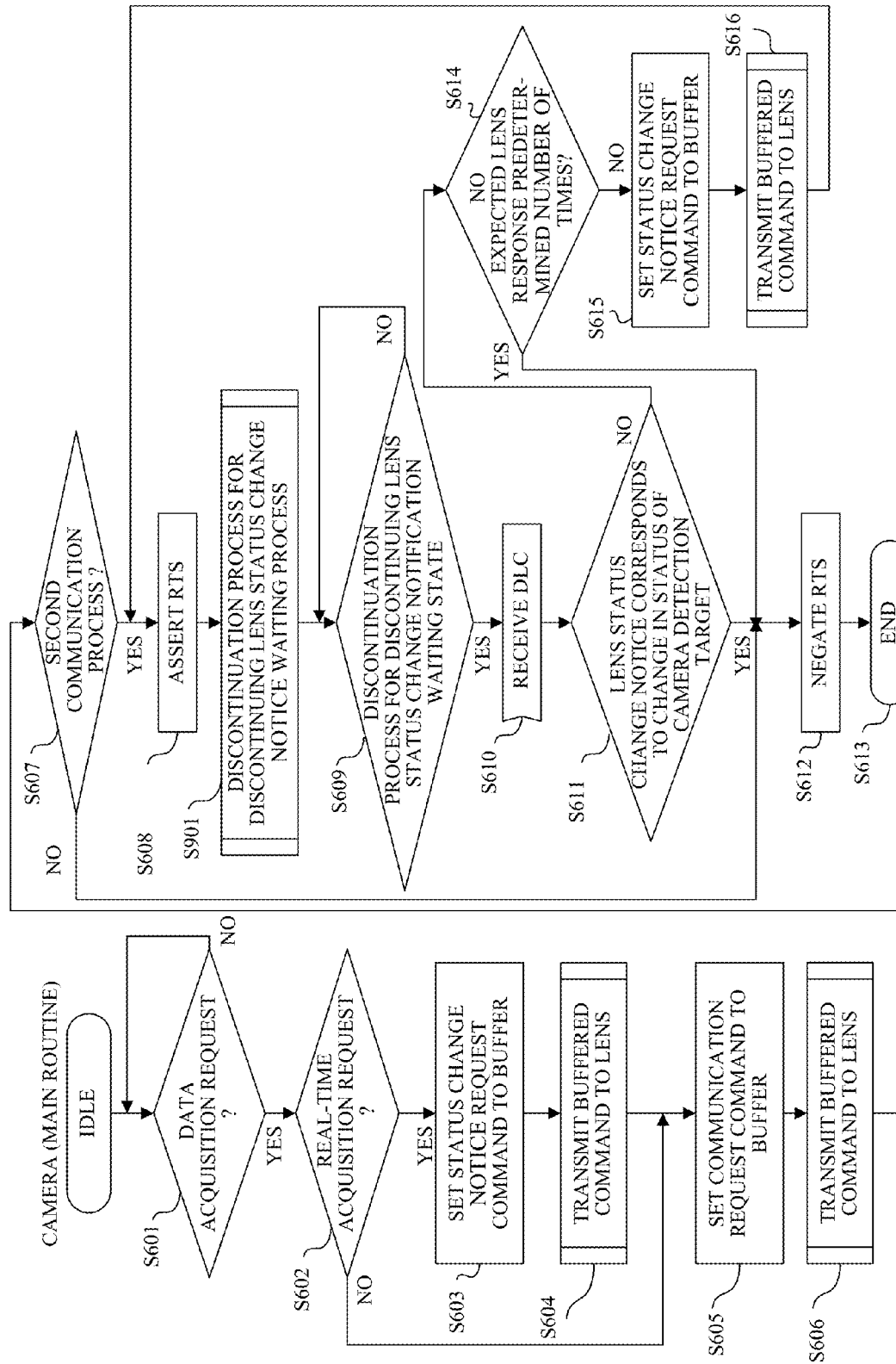
FIGS. 11A and 11B illustrate a process performed by the camera microcomputer in a second communication process in Embodiment 3 of the present invention.
Figure 11B:
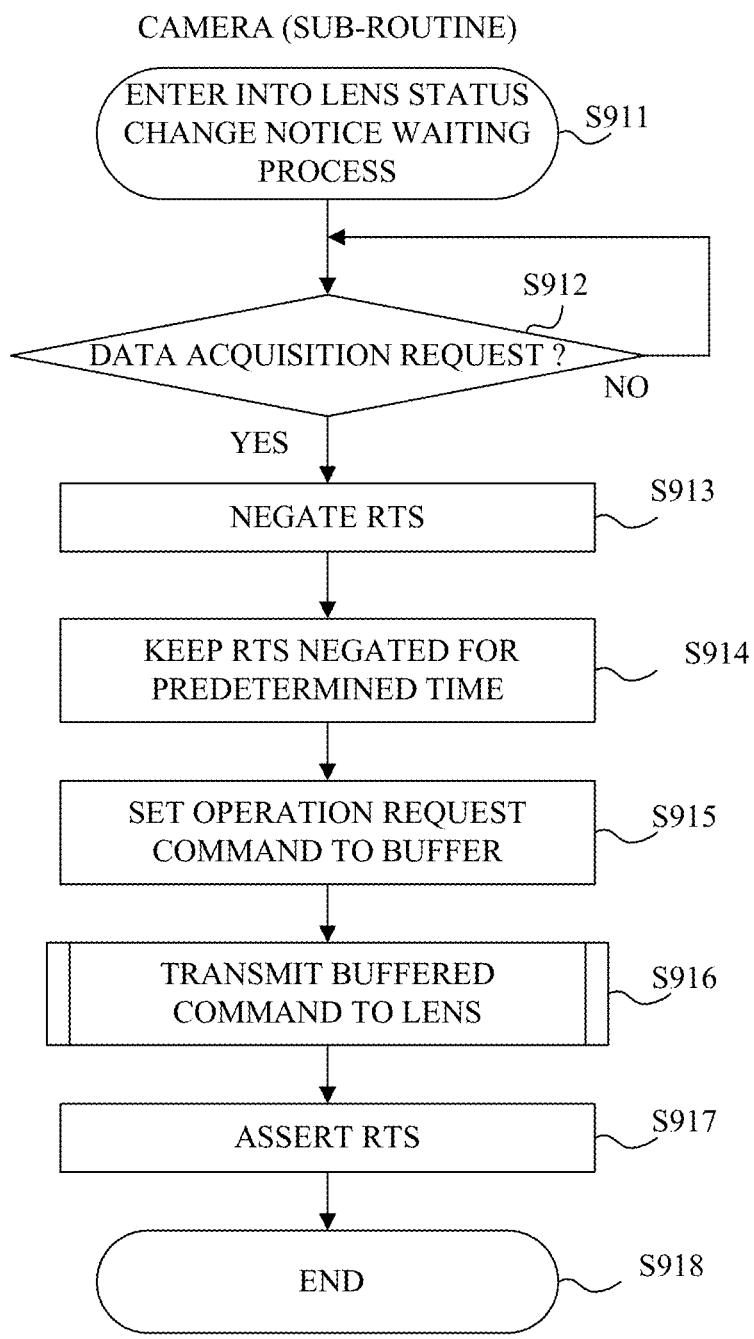

Next, with reference to flowcharts of FIGS. 11A, 11B, 12A and 12B, communication processes performed by the camera and lens microcomputers 205 and 111 will be described. First, the communication process performed by the camera microcomputer 205 will be described with reference to FIGS. 11A and 11B. Steps 601 to 608 in FIG. 11A are the same as those in Embodiment 1 (FIG. 6A), so that description thereof is omitted.

The camera microcomputer 205 having asserted the request-to-send signal RTS at step 608 and thereby having entered into the process for waiting for receiving the lens status change notice (the process hereinafter referred to as "a lens status change notice waiting process") performs at step 901 a discontinuation process for discontinuing the lens status change notice waiting process. The discontinuation process (sub-routine process) for discontinuing the lens status change notice waiting process will be described with reference to FIG. 11B.

The camera microcomputer 205 having entered into the sub-routine process at step 911 determines at step 912 whether or not another data acquisition request is provided from any functional module in the camera body 200 during the lens status change notice waiting process. The other data acquisition request is, for example, a request for acquiring data required to be acquired from the lens microcomputer 111 in order to perform an AE control depending on a photometry result while the camera microcomputer 205 waits for receiving the lens status change notice indicating stop of the focus drive in the AF control.

Next at step 913, the camera microcomputer 205 negates the request-to-send signal RTS, and at step 914 keeps the negation for the predetermined time (804 in FIG. 10). Next at step 915, the camera microcomputer 205 sets an operation request command corresponding to the data acquisition request provided at step 912 to the transmission data buffer 302. Next at step 916, the camera microcomputer 205 performs the sub-routine process described with reference to FIG. 6B for transmitting the multiple-byte camera data signal DCL to the lens microcomputer 111. Next at step 917, the camera microcomputer 205 asserts the request-to-send signal RTS again, and keeps the assertion. This assertion corresponds to the assertion 809 in FIG. 10.

The camera microcomputer 205 performing the above-described sub-routine process enables, during the lens status change notice waiting process, temporarily switching its communication process to a normal communication process (first communication process) and thereby transmitting the other operation request command to the lens microcomputer 111. Then, after transmitting the other operation request command, the camera microcomputer 205 reenters into the lens status change notice waiting process. Steps 609 to 616 in FIG. 11A are the same as those in Embodiment 1 (FIG. 6A), so that description thereof is omitted.

Figure 12A:
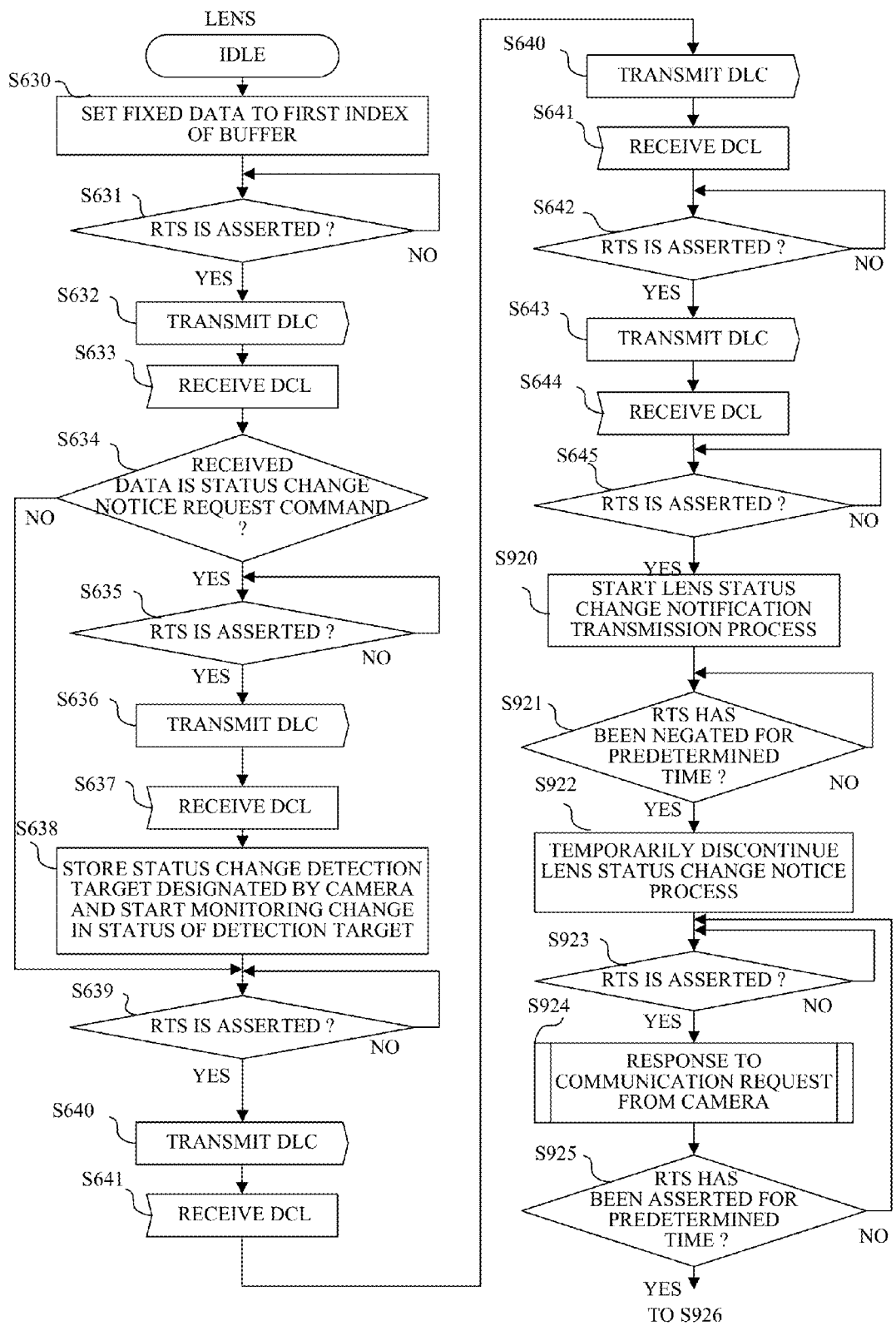
FIGS. 12A and 12B illustrate a process performed by the lens microcomputer in the second communication process in Embodiment 3.

Next, the communication process performed by the lens microcomputer 111 will be described with reference to FIGS. 12A and 12B. Steps 630 to 645 in FIG. 12A are the same as those in Embodiment 1 (FIGS. 7A and 7B), so that description thereof is omitted. The lens microcomputer 111 having determined at step 645 that the request-to-send signal RTS is asserted performs at step 920 a process (second communication process) for transmitting the lens status change notice. The lens microcomputer 111 simultaneously starts a monitor process for cyclically monitoring the request-to-send signal RTS. This monitor process is performed to detect that the camera microcomputer 205 requests a temporal discontinuation of the lens status change notice waiting process.

The lens microcomputer 111 monitors the request-to-send signal RTS at a shorter cycle than the predetermined time (804 in FIG. 10) for which the camera microcomputer 205 negates the request-to-send signal RTS at step 914. Next at step 921, the lens microcomputer 111 determines whether or not the monitor process started at step 920 has detected that the request-to-send signal RTS has been negated for the predetermined time. If the request-to-send signal RTS has been negated for the predetermined time, the lens microcomputer 111 proceeds to step 922. If the request-to-send signal RTS has not been negated for the predetermined time, the lens microcomputer 111 repeats the determination at step 921. At step 922, the lens microcomputer 111 confirms the request for discontinuing the lens status change notice waiting process from the camera microcomputer 205 to switch its communication process from the second communication process to the first communication process.

Then, at step 923, the lens microcomputer 111 waits for the request-to-send signal RTS being asserted by the camera microcomputer 205, and in response to the assertion proceeds to step 924. At step 924, the lens microcomputer 111 responds to the operation request commands received from the camera microcomputer 208 at steps 911 to 918 in FIG. 11B. Next at step 925, the lens microcomputer 111 determines whether or not the request-to-send signal RTS is kept asserted by the camera microcomputer 205 for the predetermined time (810 in FIG. 10). If the request-to-send signal RTS is kept asserted for the predetermined time, the lens microcomputer 111 returns to the process (second communication process) for transmitting the lens status change notice. If the request-to-send signal RTS is negated without being kept asserted for the predetermined time, the lens microcomputer 111 continues the first communication process.

Figure 12B:
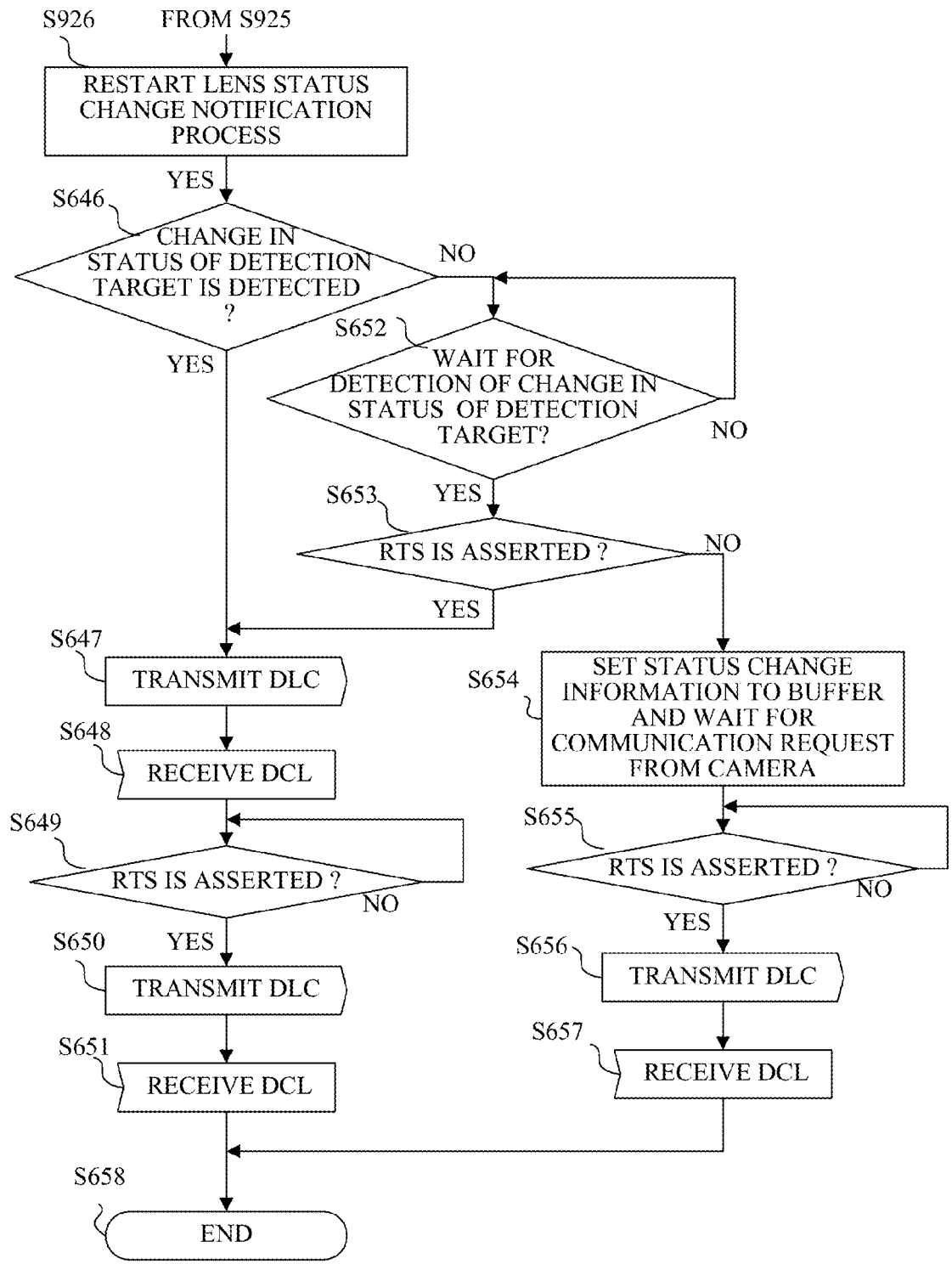

Subsequent steps 646 to 658 in FIG. 12B are the same as those in Embodiment 1 (FIG. 7B), so that description thereof is omitted. In this embodiment, even in the lens status change notice waiting process, the camera microcomputer 205 can temporarily discontinue that process to transmit the other operation request command to the lens microcomputer 111. Then, the camera microcomputer 205 can return to the lens status change notice waiting process. Therefore, this embodiment not only enables reducing a delay of transmitting the lens status change notice to the camera microcomputer 205, but also allows the camera microcomputer 205 to transmit arbitrary operation request commands to the lens microcomputer 111 at arbitrary times. This embodiment described the case where the camera microcomputer 205 discontinues the lens status change notice waiting process only once. However, the camera microcomputer 205 discontinues the lens status change notice waiting process multiple times according to discontinuation requests provided at mutually different times.

Although the above embodiment described the case of using the interchangeable lens as an example of accessory apparatuses, other accessory apparatuses such as an illumination (flash) apparatus may be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-145075, filed on Jul. 25, 2016, which is hereby incorporated by reference herein in its entirety.

What is claimed is:

1. An image-capturing apparatus to which an accessory apparatus is detachably attachable, the image-capturing apparatus comprising:
   a camera communicator configured to provide, with the accessory apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus; and
   a camera controller configured (a) to provide, by switching a signal level of the notification channel from a first level to a second level, a transmission request as the notice to the accessory apparatus to cause the accessory apparatus to transmit the accessory data to the image-capturing apparatus through the first data communication channel and (b) to transmit the camera data to the accessory apparatus through the second data communication channel,
   wherein the camera controller is configured to be capable of selectively performing:
   a first process to switch, after the accessory apparatus receives the transmission request and in response thereto starts transmitting first accessary data as the accessory data, the signal level of the notification channel from the second level to the first level; and
   a second process to keep, after the accessory apparatus receives the transmission request and in response thereto ends transmitting the first accessary data, the signal level of the notification channel at the second level, and
      wherein the camera controller is configured to, while keeping the signal level of the notification channel at the second level in the second process, receive second accessory data transmitted from the accessory apparatus as the accessory data different from the first accessory data.

2. An image-capturing apparatus according to claim 1, wherein:
   the camera controller is configured to be capable of transmitting, to the accessory apparatus, first camera data as the camera data requesting the accessory apparatus to perform a predetermined operation; and
   the second accessory data indicates a change in status of the accessory apparatus performing the predetermined operation.

3. An image-capturing apparatus according to claim 2, wherein the camera controller is configured to, by discontinuing the second process, switching the signal level of the notification channel from the second level to the first level and then further switching the signal level of the notification channel to the second level, cause the accessory apparatus to transmit third accessory data as the accessory data to the image-capturing apparatus, and transmit second camera data as the camera data to the accessory apparatus.

4. An image-capturing apparatus according to claim 3, wherein the camera controller is configured to, when discontinuing the second process, keep the signal level of the notification channel at the first level for a predetermined time.

5. An image-capturing apparatus according to claim 3, wherein the camera controller is configured to, after transmitting the second camera data to the accessory apparatus, perform again the second process to keep the signal level of the notification channel at the second level.

6. An image-capturing apparatus according to claim 2, wherein:
   the image-capturing apparatus is detachably attachable to an interchangeable lens as the accessory apparatus including a lens and an aperture stop, and
   the predetermined operation includes at least one of start of driving of the lens, stop of the driving of the lens, start of driving of the aperture stop, and stop of driving of the aperture stop.

7. An accessory apparatus detachably attachable to an image-capturing apparatus, the accessory apparatus comprising:
   an accessory communicator configured to provide, with the image-capturing apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus; and
   an accessory controller configured (a) to, in response to receiving from the image-capturing apparatus through the notification channel a transmission request as the notice provided by a signal level of the notification channel being switched from a first level to a second level, transmit the accessory data to the image-capturing apparatus through the first data communication channel and (b) to receive the camera data transmitted from the image-capturing apparatus through the second data communication channel,
   wherein, when the image-capturing apparatus is configured to be capable of selectively performing (a) a first process to switch, after the accessory apparatus receives the transmission request and in response thereto starts transmitting first accessary data as the accessory data, the signal level of the notification channel from the second level to the first level and (b) a second process to keep, after the accessory apparatus receives the transmission request and in response thereto ends transmitting the first accessary data, the signal level of the notification channel at the second level, the accessory controller is configured to, while the signal level of the notification channel is kept at the second level, transmit second accessory data as the accessory data different from the first accessory data to the image-capturing apparatus.

8. An accessory apparatus according to claim 7, wherein, when the image-capturing apparatus is configured to be capable of transmitting, to the accessory apparatus, first camera data as the camera data requesting the accessory apparatus to perform a predetermined operation, the second accessory data indicates a change in status of the accessory apparatus performing the predetermined operation.

9. An accessory apparatus according to claim 8, wherein the accessory controller is configured to, in response to the signal level of the notification channel being switched from the second level to the first level with discontinuation of the second process and to the signal level of the notification channel then being further switched to the second level, transmit third accessory data as the accessory data to the image-capturing apparatus, and receive second camera data as the camera data from the image-capturing apparatus.

10. An accessory apparatus according to claim 9, wherein the accessory controller is configured to, in response to the signal level of the notification channel being kept at the first level with discontinuation of the second process and to the signal level of the notification channel then being switched to the second level, transmit the third accessory data to the image-capturing apparatus, and receive the second camera data from the image-capturing apparatus.

11. An accessory apparatus according to claim 9, wherein the accessory controller is configured to, after receiving the second camera data and while the signal level of the notification channel is again kept at the second level in the second process, fourth accessory data as the accessory data different from the first, second and third accessory data to the image-capturing apparatus.

12. An accessory apparatus according to claim 8, wherein:
the accessory apparatus is an interchangeable lens including a lens and an aperture stop, and
the predetermined operation includes at least one of start of driving of the lens, stop of the driving of the lens, start of driving of the aperture stop, and stop of the driving of the aperture stop.

13. An image-capturing system including an image-capturing apparatus and an accessory apparatus detachably attachable to the image-capturing apparatus, the system comprising:
a camera communicator included in the image-capturing apparatus and an accessory communicator included in the accessory apparatus, the camera and accessory communicators being configured to provide therebetween, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus; and
a camera controller included in the image-capturing apparatus and an accessory controller included in the accessory apparatus, the camera controller being configured (a) to provide, by switching a signal level of the notification channel from a first level to a second level, a transmission request as the notice to the accessory controller to cause the accessory controller to transmit the accessory data to the camera controller through the first data communication channel and (b) to transmit the camera data to the accessory controller through the second data communication channel,
wherein the camera controller is configured to be capable of selectively performing:
a first process to switch, after the accessory controller receives the transmission request and in response thereto starts transmitting first accessary data as the accessory data, the signal level of the notification channel from the second level to the first level; and
a second process to keep, after the accessory controller receives the transmission request and in response thereto ends transmitting the first accessary data, the signal level of the notification channel at the second level, and
wherein:
the accessory controller is configured to, while the signal level of the notification channel is kept at the second level in the second process, transmit second accessory data as the accessory data different from the first accessory data to the camera controller; and
the camera controller is configured to, while keeping the signal level of the notification channel at the second level in the second process, receive the second accessory data.

14. A control method of controlling an image-capturing apparatus to which an accessory apparatus is detachably attachable, the image-capturing apparatus providing, with the accessory apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus, the control method comprising the steps of:
causing the image-capturing apparatus (a) to provide, by switching a signal level of the notification channel from a first level to a second level, a transmission request as the notice to the accessory apparatus to cause the accessory apparatus to transmit the accessory data to the image-capturing apparatus through the first data communication channel and (b) to transmit the camera data to the accessory apparatus through the second data communication channel,
allowing the image-capturing apparatus to selectively perform:
a first process to switch, after the accessory apparatus receives the transmission request and in response thereto starts transmitting first accessary data as the accessory data, the signal level of the notification channel from the second level to the first level; and
a second process to keep, after the accessory apparatus receives the transmission request and in response thereto ends transmitting the first accessary data, the signal level of the notification channel at the second level; and
causing the image-capturing apparatus to, while keeping the signal level of the notification channel at the second level in the second process, receive second accessory data transmitted from the accessory apparatus as the accessory data different from the first accessory data.

15. A control method of controlling an accessory apparatus detachably attachable to an image-capturing apparatus, the accessory apparatus providing, with the image-capturing apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus, the control method comprising the steps of:

causing the accessory apparatus (a) to transmit, in response to receiving from the image-capturing apparatus through the notification channel a transmission request as the notice provided by a signal level of the notification channel being switched from a first level to a second level, the accessory data to the image-capturing apparatus through the first data communication channel and (b) to receive the camera data transmitted from the image-capturing apparatus through the second data communication channel; and when the image-capturing apparatus is configured to be capable of selectively performing (a) a first process to switch, after the accessory apparatus receives the transmission request and in response thereto starts transmitting first accessary data as the accessory data, the signal level of the notification channel from the second level to the first level and (b) a second process to keep, after the accessory apparatus receives the transmission request and in response thereto ends transmitting the first accessary data, the signal level of the notification channel at the second level, causing the accessory apparatus to, while the signal level of the notification channel is kept at the second level, transmit second accessory data as the accessory data different from the first accessary data to the image-capturing apparatus.

16. A non-transitory storage medium storing a computer program for causing a computer to execute a control method of controlling an image-capturing apparatus to which an accessory apparatus is detachably attachable, the image-capturing apparatus providing, with the accessory apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus, the control method comprising the steps of:

causing the image-capturing apparatus (a) to provide, by switching a signal level of the notification channel from a first level to a second level, a transmission request as the notice to the accessory apparatus to cause the accessory apparatus to transmit the accessory data to the image-capturing apparatus through the first data communication channel and (b) to transmit the camera data to the accessory apparatus through the second data communication channel, allowing the image-capturing apparatus to selectively perform:

a first process to switch, after the accessory apparatus receives the transmission request and in response thereto starts transmitting first accessary data as the accessory data, the signal level of the notification channel from the second level to the first level; and a second process to keep, after the accessory apparatus receives the transmission request and in response thereto ends transmitting the first accessary data, the signal level of the notification channel at the second level; and causing the image-capturing apparatus to, while keeping the signal level of the notification channel at the second level in the second process, receive second accessory data transmitted from the accessory apparatus as the accessory data different from the first accessory data.

17. A non-transitory storage medium storing a computer program for causing a computer to execute a control method of controlling an accessory apparatus detachably attachable to an image-capturing apparatus, the accessory apparatus providing, with the image-capturing apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus, the control method comprising the steps of:

causing the accessory apparatus (a) to transmit, in response to receiving from the image-capturing apparatus through the notification channel a transmission request as the notice provided by a signal level of the notification channel being switched from a first level to a second level, the accessory data to the image-capturing apparatus through the first data communication channel and (b) to receive the camera data transmitted from the image-capturing apparatus through the second data communication channel; and when the image-capturing apparatus is configured to be capable of selectively performing (a) a first process to switch, after the accessory apparatus receives the transmission request and in response thereto starts transmitting first accessary data as the accessory data, the signal level of the notification channel from the second level to the first level and (b) a second process to keep, after the accessory apparatus receives the transmission request and in response thereto ends transmitting the first accessary data, the signal level of the notification channel at the second level, causing the accessory apparatus to, while the signal level of the notification channel is kept at the second level, transmit second accessory data as the accessory data different from the first accessary data to the image-capturing apparatus.

* * * * *